United States Patent [19]
Dunfield et al.

[11] Patent Number: 5,587,617
[45] Date of Patent: Dec. 24, 1996

[54] INTEGRATED PASSIVE MAGNETIC BEARING SYSTEM AND SPINDLE MAGNET FOR USE IN AN AXIAL MAGNET SPINDLE MOTOR

[75] Inventors: John C. Dunfield; Kamran Oveyssi, both of Aptos, Calif.

[73] Assignee: Seagate Technology, Inc., Scotts Valley, Calif.

[21] Appl. No.: 478,271

[22] Filed: Jun. 7, 1995

Related U.S. Application Data

[63] Continuation of Ser. No. 289,949, Aug. 12, 1994.
[51] Int. Cl.$^6$ .................................................. H02K 7/09
[52] U.S. Cl. .................................... 310/90.5; 310/156
[58] Field of Search ............................ 310/67 R, 90, 310/90.5, 156, 194; 360/98.09, 99.09, 99.08

[56] References Cited

U.S. PATENT DOCUMENTS

| | | | |
|---|---|---|---|
| 4,211,452 | 7/1980 | Poubeau | 310/90.5 |
| 5,223,758 | 6/1993 | Kataoka et al. | 310/90 |
| 5,325,006 | 6/1994 | Uno et al. | 310/156 |

*Primary Examiner*—Mark O. Budd
*Attorney, Agent, or Firm*—Flehr, Hohbach, Test, Albritton & Herbert

[57] ABSTRACT

An apparatus for rotatably journaling a rotor of a flat spindle motor about a stator comprising a spindle magnet disc disposed on the rotor assembly of the flat spindle motor and journaled about the spindle motor shaft having a disc shaped first magnetized region with an outer radius r comprised of a plurality of axial aligned poles, a disc shaped second region having an outer radius r2 (where r2>r) comprised of a single pole, and a disc shaped non-magnetized spacer region disposed there between. The integrated spindle magnet disc is disposed on the inside surface of a rotor over complementary axially aligned electromagnet poles which are disposed on the base of the stator assembly. A like aligned single pole is fixedly attached to the stator and disposed in opposition to the second magnetized region having like aligned pole of the integrated spindle permanent magnet. The single poles are disposed on both the rotor and stator in attraction mode with opposite poles facing one another, or in opposition mode with a complete or partial offset thereby forming a stable magnetic bearing for maintaining rotor displacement about the stator in conjunction with a conventional pivot. The stator base assembly is extended toward the first magnetized region to provide axial pre-load for the motor. The electromagnet poles further include a steel bobbin for increased flux density and added axial stiffness. Finally, eddy current generation means are disposed between the stator base and the like aligned single pole for improved dampening characteristics.

18 Claims, 18 Drawing Sheets

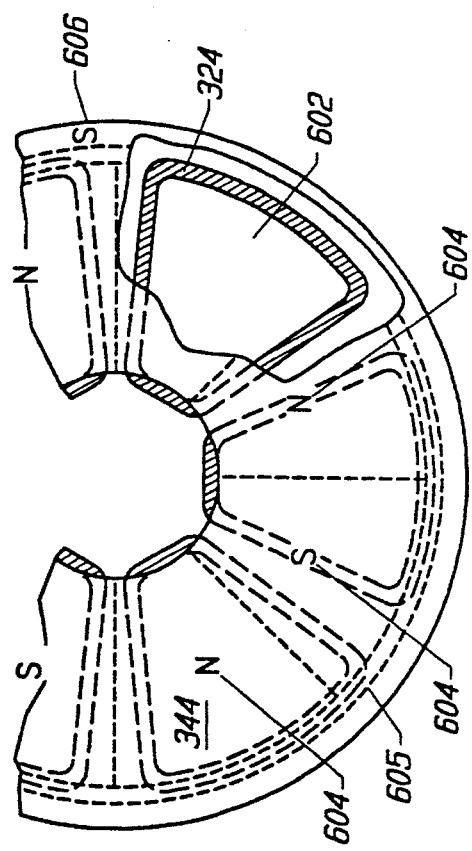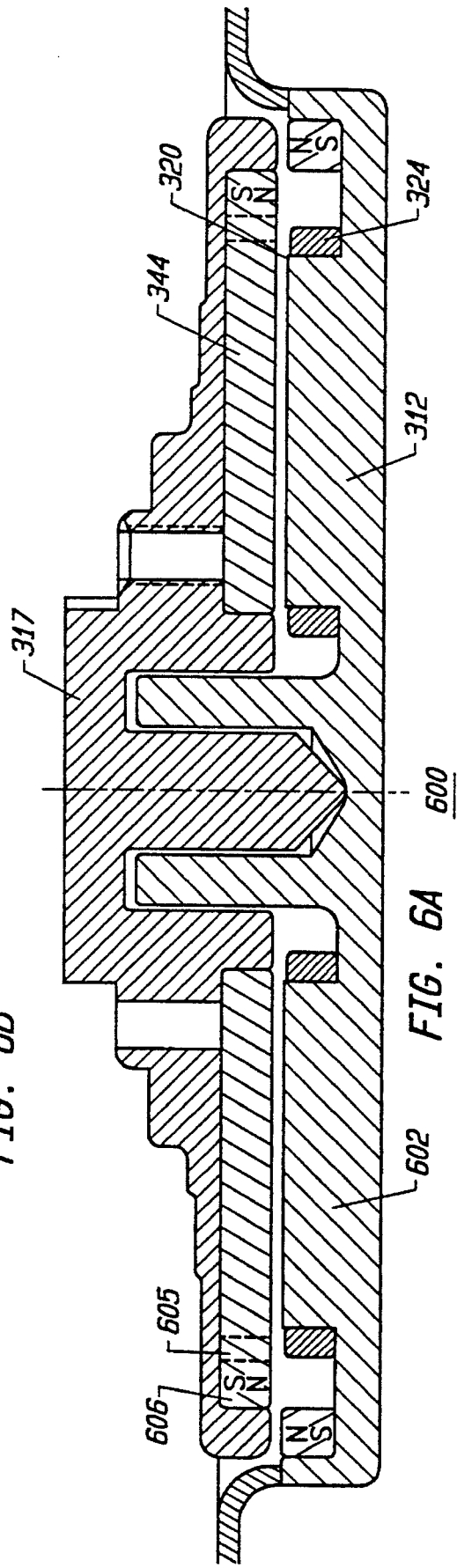

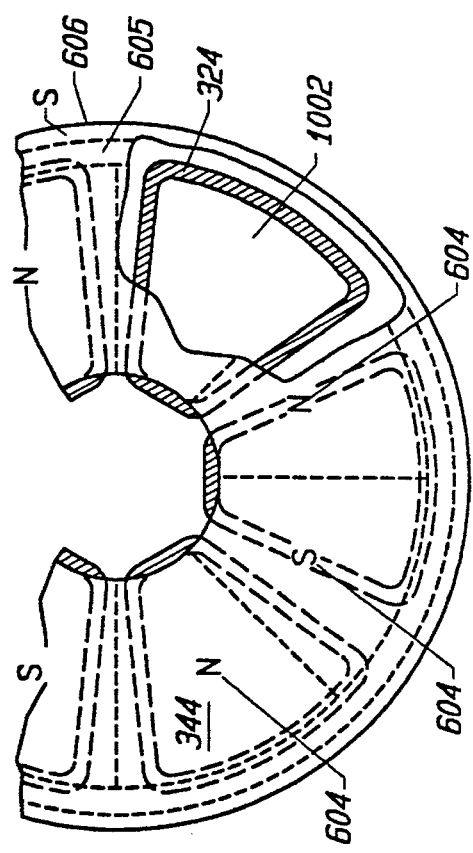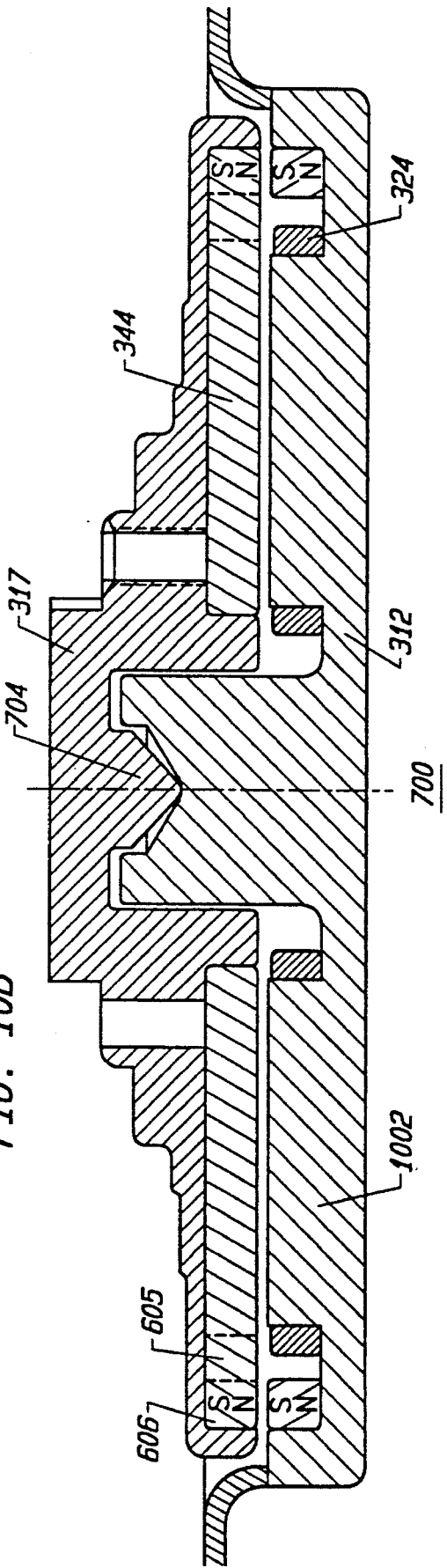
FIG. 10B
FIG. 10A

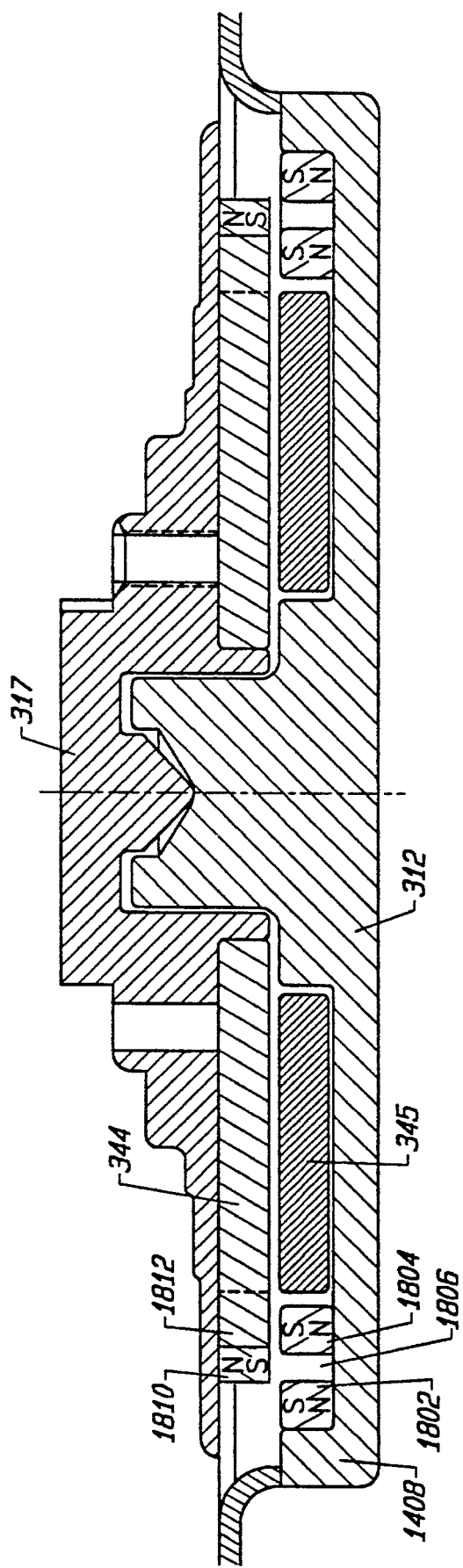

INTEGRATED PASSIVE MAGNETIC BEARING SYSTEM AND SPINDLE MAGNET FOR USE IN AN AXIAL MAGNET SPINDLE MOTOR

This is a continuation of application Ser. No. 08/289,949 filed Aug. 12, 1994.

The present invention relates generally to information storage systems and particularly to an apparatus for rotatably journaling a rotor of a spindle motor about a stator. The present invention comprises a plurality of magnetic bearings including an annular ring single-pole magnet which is integral with a radially disposed permanent spindle magnet of a flat spindle motor rotor assembly and disposed in opposition to a complementary annular magnet ring attached to the stator assembly of the flat spindle motor. These magnetic bearings in conjunction with an axial pivot form a radially stable beating system for maintaining rotor displacement about the stator in conjunction with a conventional axial pivot. The present invention further comprises an extended stator base for interacting with the spindle motor magnet and a copper ring assembly disposed on a pole of the magnetic bearing thereby resulting in improved dampening characteristics. The present invention provides for the unique combination of magnetic bearings with other conventional pivots for use in highly stable motor assemblies such as are especially useful in disc drive systems. The present invention also discloses an improved performance spindle motor by introducing a steel bobbin for added axial magnetic preload

BACKGROUND OF THE INVENTION

The present invention provides an improvement to a spindle motor useful in an information storage system in which ball bearings are utilized to journal a rotor about a shaft. The embodiments of the present invention are designed to incorporate a magnetic bearing and a multi-pole spindle magnet disc in a reduced height flat spindle motor to improve motor performance. Such motors are especially useful in information storage systems such as disc drives.

Overall disc drive size is of paramount concern to the disc drive design engineers. As smaller, light weight, portable computers have grown in demand, the disc drive engineer has continually searched for ways to reduce both the overall size and weight of the disc drive while maintaining or improving overall drive performance. FIG. 1 shows a flat spindle motor in the prior art developed by the assignees of the present invention. In the prior art, conventional ball bearings 10 were utilized to journal the rotor assembly 12 about the stator 14.

However, the use of conventional ball bearing assemblies in conjunction with high rotational speed devices has evidenced problems which are deleterious to drive system performance. Specifically, conventional mechanical bearings used are subject to metal wear, vibration/shock, have higher acoustics and friction problems. In order to alleviate the problems associated with conventional mechanical bearings, magnetic bearings may be substituted, thereby improving overall system performance. The use of magnetic bearings to improve disc drive system performance was disclosed in the concurrently filed United States patent application Ser. No. 08/201,676 entitled "Passive Magnetic Bearings for a Spindle Motor" by Dunfield et al., and is expressly incorporated herein by reference. However, the multi-pole configurations disclosed therein are optimized for stability rather than size considerations and are thus not ideally suited for flat spindle motor applications.

Spindle motors utilizing permanent and electromagnets in combination are also well known in the art. Specifically, the combination of a permanent magnet attached to a rotor, interacting with a separate electromagnet assembly attached to a fixed stator, as a means of journaling a disc about a stationary shaft, is well known in the art. In the prior art, spindle permanent magnets served only as a means for rotating the rotor about the stator via an axial pivot. Separate means for maintaining the physical relationship between the rotor and the stator, namely conventional ball bearing systems, were previously employed. These separate means required extra space, additional piece parts, lubricants and contributed to the overall manufacturing cost of the final product. In order to eliminate these separate means, magnetic bearings integrated with the spindle magnet of a spindle motor may be substituted, thereby minimizing piece parts and optimizing size considerations. The use an integrated spindle magnet and magnetic bearing to improve disc drive system performance was disclosed in the concurrently filed United States patent application Docket No. A-58554 entitled "An Integrated Passive Magnetic Bearing System and Spindle Magnet for Use In Spindle Motor, U.S. Ser. No. 08/201,798" by Dunfield et al., and is expressly incorporated herein by reference.

However, the integrated spindle magnet and magnetic bearings disclosed therein were oriented axially opposing the stator winding laminated stacks. Accordingly, a single pole magnetic bearing integrated with the spindle magnet provided sufficient radial support for the spindle motor. In the flat spindle motors of the prior art, the spindle magnet is oriented perpendicular to the axis of rotation, in order to minimize the overall height of the spindle motor. As such the single magnet pole configuration disclosed in Dunfield et al. '554 may not ordinarily be sufficiently stable in the radial direction.

Additionally, a mechanical bearing provides axial support, helping to hold together the rotor and stator in an axial direction in the event of motor inversion. Accordingly, the removal of the mechanical bearings requires other means of maintaining the relative axial positions of the spindle motor rotor and stator assemblies. Dunfield et al '554 and '697 utilize multi-pole magnetic bearings in attraction mode as well as the attraction of the rotor and stator steel to the magnetic bearings in order to maintain axial orientation or pre-load. As described previously, flat spindle motor design is not ideally suited for multi-pole bearings due to size optimization goals. Unfortunately, single-pole magnetic bearings may not provide sufficient pre-load because of their small size.

Finally, disc drives are designed to sustain mechanical shocks. This is especially true in flat spindle motor applications for uses in portable computers and disc drive systems. Mechanical bearings maintain a hard contact interface between the stator and the rotor assembly and thereby provide a rigid interface. Accordingly, shocks received by the stator are transferred to the rotor and conversely. In order to minimize these shocks, shock mitigation means may be employed to dampen the shocks seen by the overall unit, without concern for the individual rotor or stator assembly. However, the use of magnetic bearings raises different problems. Since the mechanical rigid interface between the stator and rotor no longer exists, ordinary shock mitigation means which dampen the shocks to the entire motor assembly are no longer sufficient. This is because without the hard mechanical interface between the rotor and stator assembly found in a mechanical bearing configuration, the magnetic bearings tend to isolate the rotor from any mitigation or dampening that conventional shock mitigation means provide. Unfortunately, magnetic bearings exhibit very low dampening characteristics. As such, a magnetic bearing would ordinarily provide insufficient dampening of shocks received, and thereby deleteriously affect spindle motor operation in the high shock environments ordinarily associated with flat spindle motor applications.

SUMMARY OF THE INVENTION

It is the object of the present invention to provide an apparatus for rotatably journaling a rotor of a flat spindle motor about a shaft by means of a magnetic bearing assembly integral to a spindle magnet of the spindle motor.

It is another object of the present invention to provide a spindle motor having a spindle permanent magnet which produces sufficient torque to spin the motor while incorporating a magnetized region which interacts with a stationary magnet region so as to maintain the physical relationship between the rotor and stator of the flat spindle motor.

It is another object of the present invention to provide a radially and axially stable bearing assembly for use in a disc drive motor.

It is another object of the present invention to provide a bearing assembly for use in a disc drive that provides dampening from repeated shocks.

It is a further object of the present invention to provide a balanced bearing assembly for use in a disc drive which has minimal losses and a substantially improved non-repeatable run-out characteristic as compared to prior art ball bearing systems.

It is a further object of the present invention to provide a magnetic bearing system for use in a disc drive in which physical size is optimized while providing sufficient directional stiffness.

It is a further object of the present invention to provide a low noise bearing system for minimizing the audible acoustic noise attributable to the operation of the bearing system.

It is a further object of the present invention to provide a bearing assembly for use in a disc drive which has minimal and stable vibration generation characteristics as compared to prior art ball bearing systems.

It is a further object of the present invention to provide a magnetic bearing for use in combination with a hydrodynamic bearing thereby providing the equivalent directional stiffness to a conventional ball bearing system.

It is a further object of the present invention to minimize the height of a spindle motor by integrating components to reduce the overall drive profile.

It is a further object of the present invention to improve the motor bias by providing means for preloading the axial bearing.

Finally, it is an object of the present invention to minimize the friction in the bearing assemblies of disc drive motors thereby extending bearing life and maximizing the mean time before failure for the bearing assembly.

In accordance with these and other objects of the invention, an apparatus is provided comprising in one set of exemplary embodiments a spindle magnet disc disposed on the rotor assembly of the flat spindle motor and journaled about the spindle motor shaft having a disc shaped first magnetized region with an outer radius r comprised of a plurality of axial aligned poles, a disc shaped second region having an outer radius r2 (where r2>r) comprised of a single pole, and a disc shaped non-magnetized spacer region disposed there between. The integrated spindle magnet disc is disposed on the inside surface of a rotor over complementary axially aligned electromagnet poles which are disposed on the base of the stator assembly. A like aligned single pole is fixedly attached to the stator and disposed in opposition to the second magnetized region having like aligned pole of the integrated spindle permanent magnet. The single poles are disposed on both the rotor and stator in attraction mode with opposite poles facing one another, or in opposition mode with a complete or partial offset thereby forming a stable magnetic bearing for maintaining rotor displacement about the stator in conjunction with a conventional pivot. The stator base assembly is extended toward the first magnetized region to provide axial pre-load for the motor. The electromagnet poles may further include a steel bobbin for increased flux density and added axial pre-load. Finally, eddy current generation means may be disposed between the stator base and the like aligned single pole for improved dampening characteristics.

Alternatively, pairs of magnetic poles used to form a magnetic bearing may be mounted in a generally opposed relationship with one on a stator hub and the other on an adjacent rotor shaft or surface in these embodiments the magnet and coils which control rotation of the motor are outboard of the magnetic bearing.

BRIEF DESCRIPTION OF THE DRAWINGS

Additional objects and features of the invention will be more readily apparent from the following detailed description and appended claims when taken in conjunction with the drawings, in which:

FIG. 6a is a cut away view of a disc drive flat spindle motor incorporating the first embodiment of the present invention including a steel bobbin for greater axial pre-load and higher flux density.

FIG. 6b is a top view of a disc drive flat spindle motor incorporating the first embodiment of the present invention including a steel bobbin for greater axial pre-load and higher flux density.

FIG. 10a is a cut away view of a disc drive flat spindle motor incorporating an alternative embodiment of the present invention including a steel bobbin for greater axial pre-load and higher flux density.

FIG. 10b is a top view of a disc drive flat spindle motor incorporating the first embodiment of the present invention including a steel bobbin for greater axial pre-load and higher flux density.

FIG. 13 is a cut away view of a disc drive flat spindle motor incorporating the third embodiment of the present invention including an extended base portion for greater axial pre-load.

FIG. 18 is a further alternative embodiment using complementary offset magnetic poles for improved radial stiffness.

DESCRIPTION OF THE PREFERRED EMBODIMENT

Figure 1:
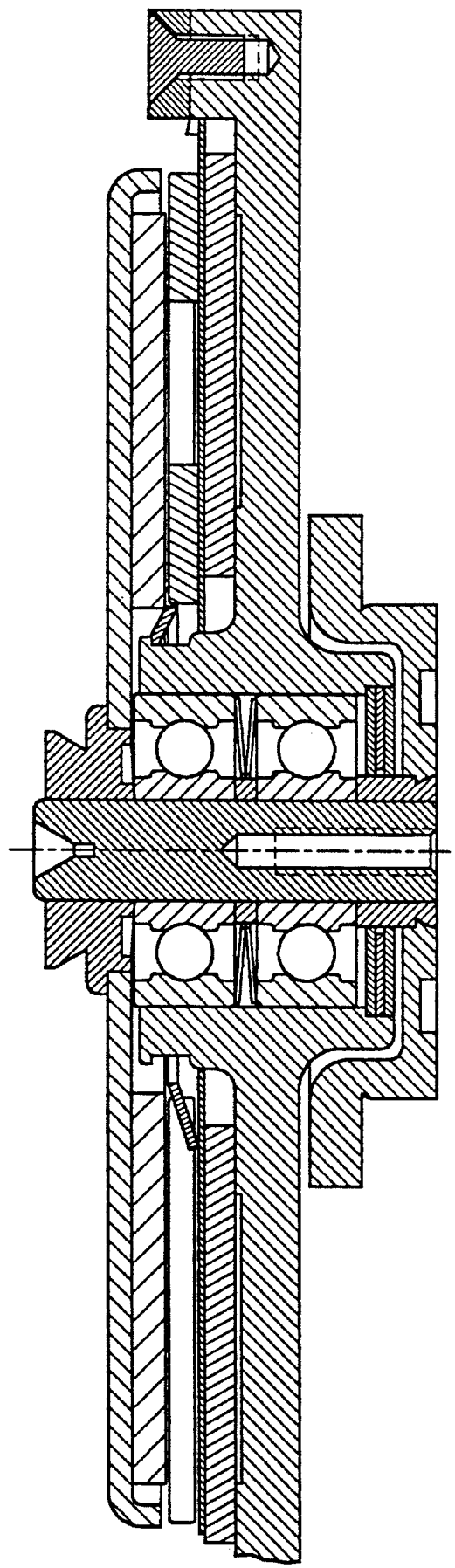
FIG. 1 is a cut-away view of a prior-art flat spindle motor including mechanical bearing means.
Figure 2:
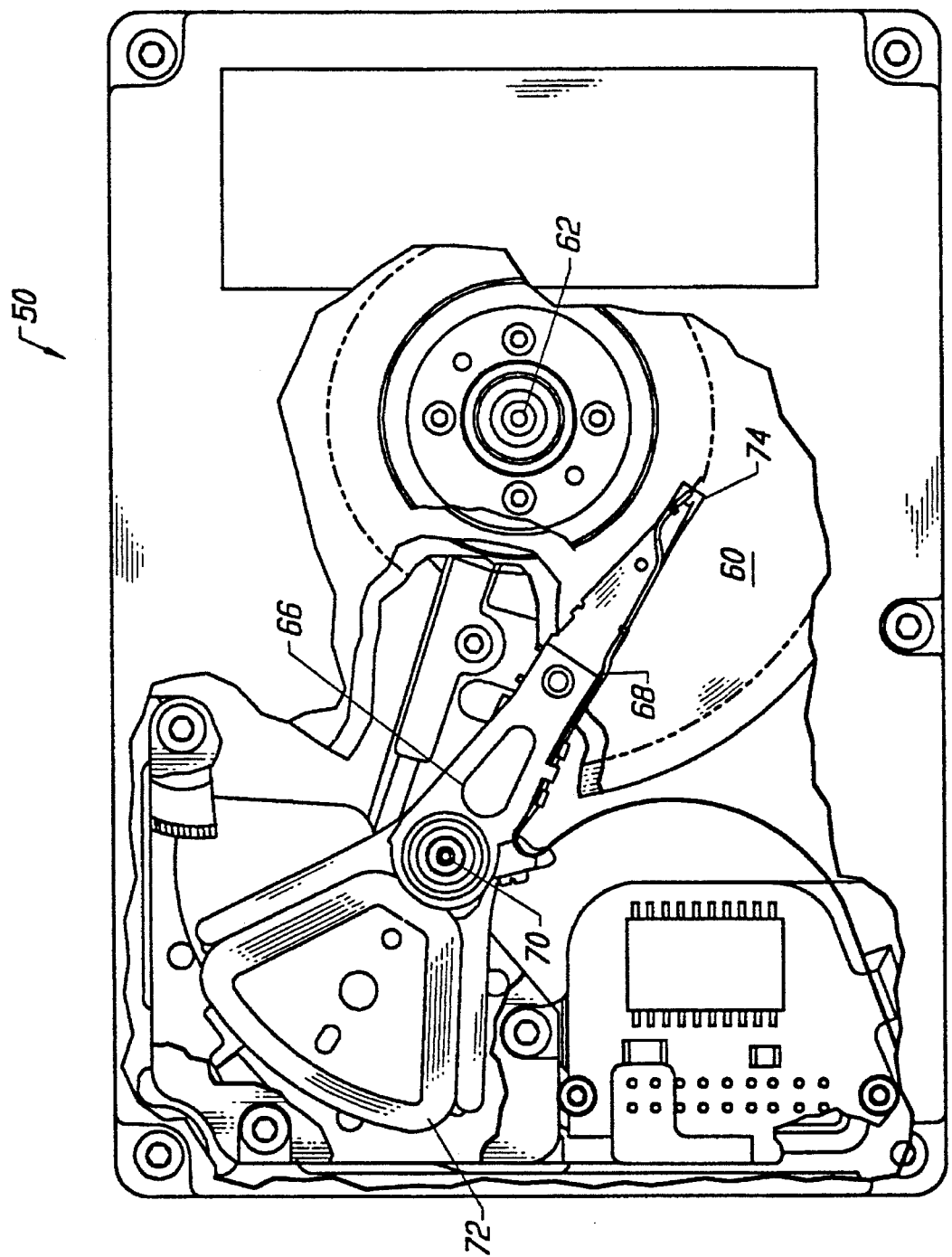
FIG. 2 is a plan view of a disc drive incorporating the first embodiment of the present invention.

Referring to FIG. 2, there is shown an cut-away view of an entire disc drive assembly 50 which represents an example of a preferred form of information storage device which may incorporate the present invention incorporating the preferred embodiment. A disc 60 is journaled about a shaft 62 which is in turn rotated by a spindle motor 64 (not shown). An actuator arm assembly 66 includes a substantially triangular shaped actuator arm 68 having a pivot point 70 around which the arm 68 rotates. A motor assembly 72 is attached to one end of arm 68 to provide the force required to pivot the arm 68 about the pivot point 70. Located at the other end of arm 68 is a read/write head assembly 74. In combination, the motor assembly 72 provides the force to rotate arm 68 about pivot 70 so as to position the read/write head assembly 74 adjacent to a specified position on the disc 60. The disc 60 is rotated such that the read/write heads fly over the surface of the disc 60 and are able to read or write data to and from the disc surface.

Figure 3:
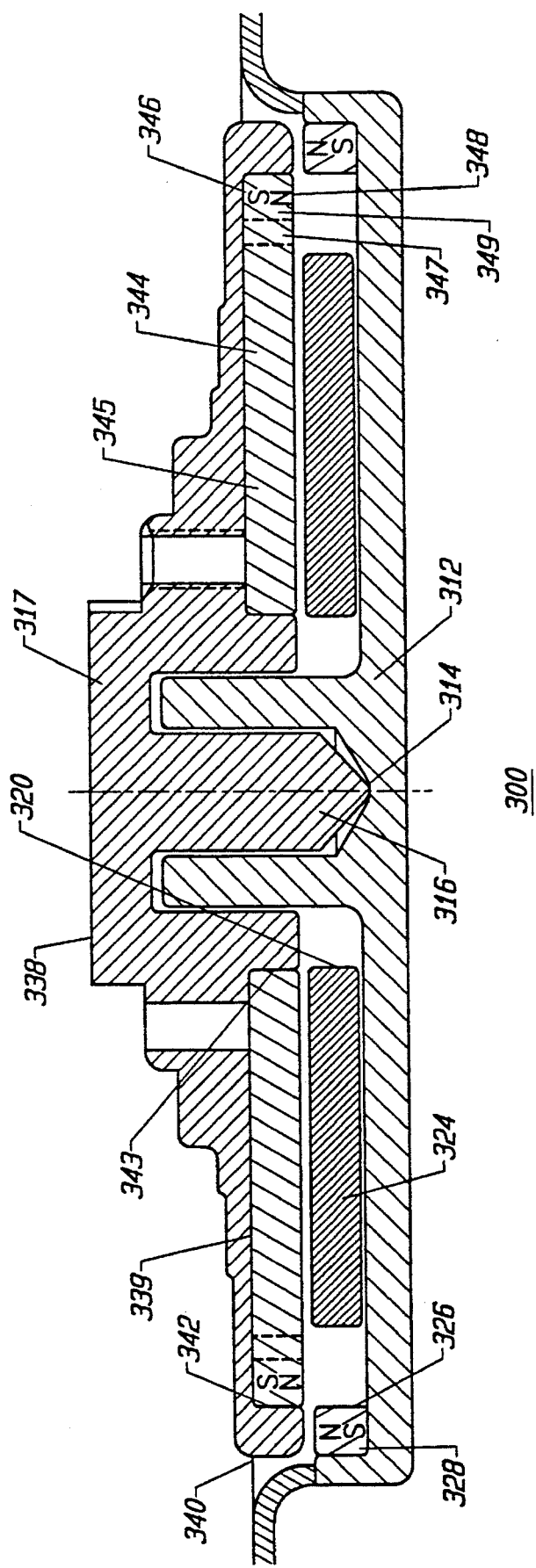
FIG. 3 is a cut away view of a disc drive flat spindle motor incorporating the first embodiment of the present invention.

Referring to FIG. 3, there is shown a cut-away view of a spindle motor assembly 300 for use in a disc drive incorporating a first embodiment of the present invention. Spindle motor assembly 300 includes a stator 312 having a conventional axial pivot 314 around which a hub shaft 316 of the rotor 317 rotates. Those ordinarily skilled in the art will recognize that a plurality of bearing types may be utilized at the axial pivot 314 including hydrodynamic, conventional, ceramic or ruby ball bearing systems, and as such the disclosure of a conventional bearing should in no way be construed as limiting. Additionally, the present invention is equally suited for fixed as well as a rotating shaft system as disclosed in the first embodiment.

Disposed on the fixed stator 312 is a plurality of stator windings 320 each comprising a bobbin 322 (not shown) surrounded by coil windings 324. In the preferred embodiment the stator windings 320 include a lightweight air-gap bobbin for supporting the coil windings 324, but as it will be described further below, other bobbin or stack configurations are equally well suited to this invention. A first annular disc 326 is disposed on the base of the stator 312 forming the lower portion of the magnetic bearing. The first annular disc 326 comprises a single magnetic pole 328 which is journaled about the stator windings 320 and attached by means of an adhesive to the stator 312. In the preferred embodiment the disc is 1.0 mm in diameter, and 1.0 mm in height. The single magnetic pole 328 is oriented parallel to the axis of rotation of the hub shaft 316, with the north pole facing the rotor 317.

The rotor 317 is substantially drum shaped with a centrally disposed hub shaft 316 extending from the interior of the drum for engaging with the axial pivot 314. The rotor 317 further comprises a top 338, interior face 339, exterior side 340, interior wall 342 and interior shoulder 343. Disposed on the interior face 339 between the interior wall 342 and the interior shoulder 343 is a disc shaped spindle permanent magnet 344 in opposition to the stator windings 320. The spindle permanent magnet 344 comprises a first 345 and second end 346. The first end 345 further comprises an even plurality of axially aligned poles (i.e. 8 in the preferred embodiment) which oppose the stator windings 320. Motor action is produced by the interaction of the plurality of axially aligned poles with current which is passed through the coil windings 324 thereby allowing for the movement of the rotor about the stator as the coil windings 324 are alternatively energized. The second end 346 of the spindle permanent magnet 344 comprises a non-magnetized region 347 adjoining an axially magnetized region 348 which forms the top portion of the magnetic beating.

The axially magnetized region 348 comprises a complementary single magnetic pole 349 which in a preferred embodiment has dimensions (1.0 mm in diameter, and 1.0 mm in height) disposed on the interior wall 342 of the rotor 317 so as to align offset and to the inside of the first magnet pole 328 which is attached to the stator 312. The complementary single magnetic pole 349 is formed by axially magnetizing the outer portion of the spindle permanent magnet 344 so as to create an axially aligned magnetic ring which forms the outer periphery of the spindle permanent magnet disc 344. The complementary single magnetic pole 349 comprises an oppositely oriented axially aligned pole which is aligned in repulsion mode over and offset to the inside of the opposing pole of the first annular disc 326. In the exemplary embodiment, the top and bottom portions of the magnetic bearing (annular disc 326 and complementary axially magnetized region 348) are separated by a gap of 0.25 mm in height.

As the coils of the stator assembly 320 are alternately energized, the interaction of the magnetic fields with the current flow will result in movement of the rotor 317 about the pivot 314. The combination of the annular disc 326 and axially magnetized region 348 act in concert as a magnetic bearing, and as configured, provide balance, radial stiffness and axial pre-load to the completed assembly. The effect of the complementary magnet pairs in repulsion about the entire circumference of the rotor provides a balanced force evenly distributed over the entire rotor. An axial pre-load exists due to the attraction of the magnetic portions of the stator 312 to the spindle magnet 344. The complementary disc 326 and 346 configuration is resistant to radial shocks because of the uniform repulsion forces that exist about the periphery of the rotor 317 due to the complementary poles 328 and 349. As such, the rotor 317 tends to stay centered about the axial pivot, maintaining a degree of radial stiffness.

One ordinarily skilled in the art would recognize that as compared to conventional ball bearing systems, the radial stiffness developed in the single pole configuration of the preferred embodiment is at least two orders of magnitude less than that provided by conventional ball bearing systems. However, the magnetic bearings are lossless, do not generate acoustic noise, are easily characterizable as to vibration frequencies, are not subject to wear or friction problems and perform consistently over life. While some finite minimum amount of radial stiffness is required to maintain a functional system (greater than 5,000 N/m), a lesser degree of radial stiffness can be compensated for by the actuator servo control or the stiffness can be augmented by the use of a combination of a magnetic bearing with other more radially stable bearing types, specifically hydrodynamic bearing systems. It should be noted that the dimensions used in this example are only exemplary and are not intended to be limiting unless so stated. As to the overlap between the pole pair, the oppsoted poles 328, 348 are offset so that the inner edge 351 of pole piece 328 is aligned with the outer edge 342 of pole piece 349. This offset is useful in maintaining radial stability. In fact, the pole pieces could overlap to some degree without serious loss of the desired radial stability.

Figure 4:
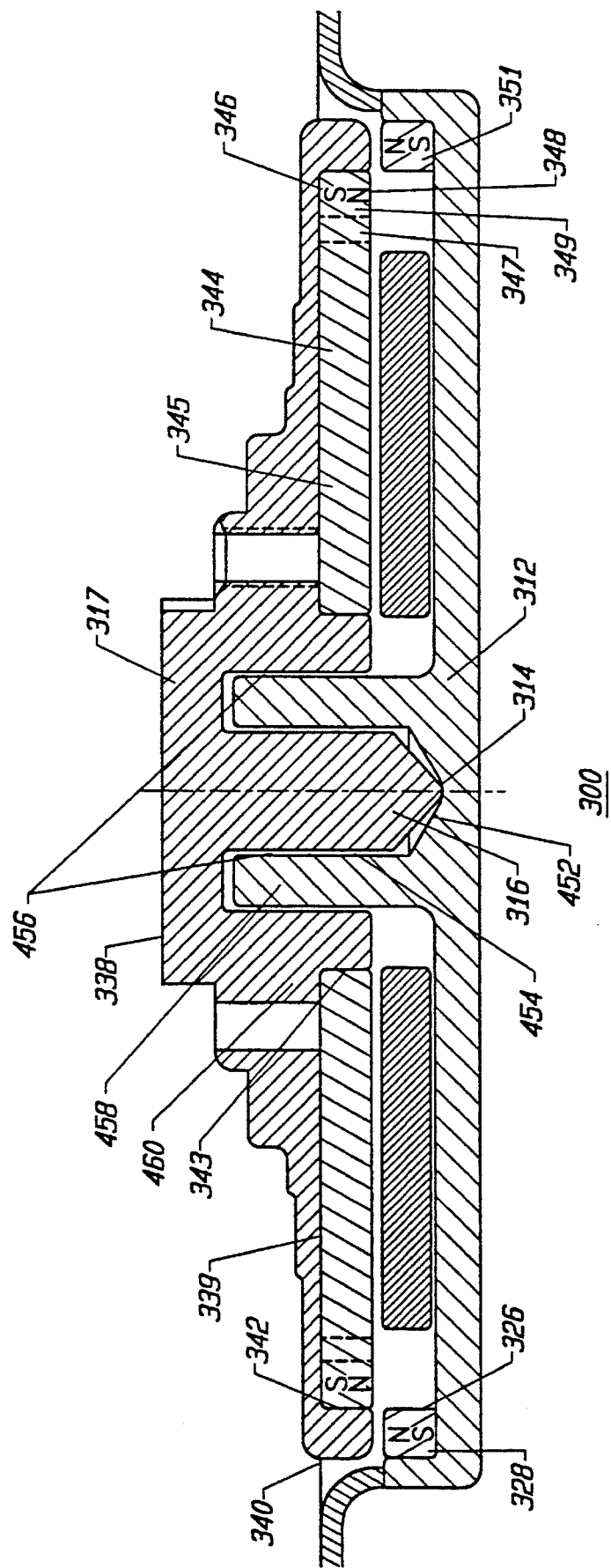
FIG. 4 is a cut away view of a disc drive flat spindle motor incorporating the first embodiment of the present invention including hydrodynamic bearings for greater axial and radial stiffness.

Referring now to FIG. 4, the first embodiment of the present invention is shown including a hydrodynamic bearing 452 for axial stiffness and a pair of hydrodynamic bearings 456 for increased radial stiffness. In this embodiment a hydrodynamic bearing 452 is utilized at the pivot 114. Those ordinarily skilled in the art, will recognize that while the disc 60 (not shown) is in motion, fluid (or air) utilized in the hydrodynamic bearing will fill the space between the bottom of hub shaft 316 and the bottom of the stator well 454 which constitutes a fluid (air) reservoir. As the pressure develops in the bearing, axial stiffness will increase, thereby augmenting the axial stiffness provided by the stand alone magnetic bearing. Similarly, the pair of hydrodynamic bearings 456 for use between the stator well and side walls of the hub shaft 316 and between the stator extensions 458 and the complementary rotor extensions 460 will provide increased radial stiffness. Again, as pressure develops in the closed reservoir, the fluid will expand and provide a rigid "cushion" between the surfaces of the rotor 317 and stator 312 yielding a significant increase over the radial stiffness provided by a magnetic bearing/conventional pivot configuration. While the hydrodynamic bearing only adds axial or radial stiffness upon operation (spin up), the combination of the hydrodynamic bearing and the magnetic bearing offers other benefits including dampening for non-operational shock attenuation as provided by the fluid reservoir system. As such the combination of the hydrodynamic bearing and the magnetic bearing offers a novel solution particularly well suited to use in a disc drive bearing system.

The magnetic bearing/hydrodynamic bearing pair also minimizes the motor start torque requirements of the spindle motor assembly 300. It is well known in the art, that after a hydrodynamic bearing comes to rest, contact often occurs between the hub shaft 316 and the side walls of the stator well 454. This is due to the lack of pressure in the hydrodynamic bearing which allows the fluid (or air) in the bearing to recede controlled by the laws of gravity, surface tension etc. As such, upon start up, the hydrodynamic bearing requires a large motor torque to break free the metal to metal contact developed after the hub shaft has come to rest against the stator well side walls. The novel combination of the hydrodynamic bearing used as an axial pivot in conjunction with the magnetic bearing eliminates this motor start torque problem. Due to the repulsion mode orientation of the complementarily offset poles, upon coming to rest, the bearing system of the present invention would maintain the hub shaft 316 centrally disposed in the stator well 454, thereby eliminating or substantially reducing any friction contact at start up. This alignment capability is unique to the magnetic bearing of the present invention. It is also apparent that the magnetic bearing shown herein is useful with most known designs for hydrodynamic bearings; therefoer the scope of the invention is not limited to use with any particular hydrodynamic bearing design shown herein.

Figure 5:
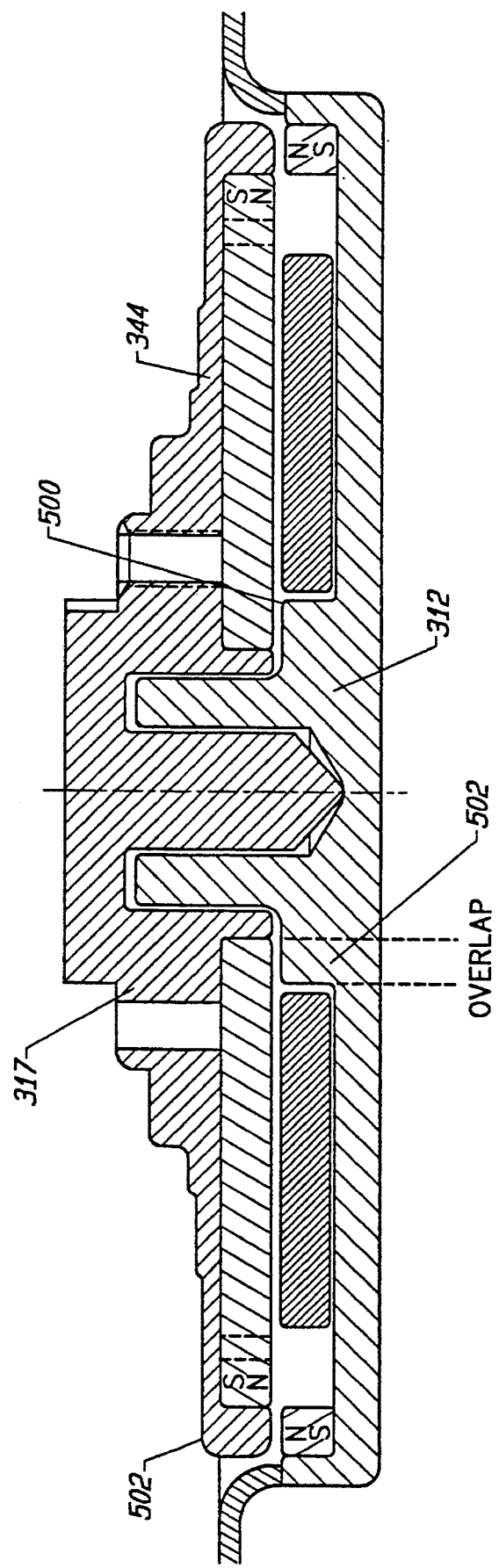
FIG. 5 is a cut away view of a disc drive flat spindle motor incorporating the first embodiment of the present invention including an extended base portion for greater axial pre-load.

Those ordinarily skilled in the art will recognize that the small axial pre-load that is provided by this configuration may be insufficient for all applications. Specifically, if higher axial loading is required, or if larger shock mitigation is desirable then this configuration can be augmented by the use of an extended steel base portion. Referring to FIG. 5, the first embodiment of the present invention is shown with an extended base portion 500. The extended base portion 500 provides additional attractive forces between the spindle motor magnet 344 and the base portion of the stator 312 in the overlap region 502. As such the rotor 317 is pre-loaded to engage with the stator 312 by means of the overlap portion 502 which acts as a magnetic return path for attractive forces developed between the spindle magnet 344 and the steel stator 312.

Referring next to FIG. 6A, a second means of increasing the axial pre-load is shown for a flat spindle motor 600. In this configuration, a steel bobbin 602 is utilized extending the base portion of the stator 312 toward the spindle magnet 344 in the region of the stator winding assembly 320. In the preferred embodiment the steel bobbin 602 may be constructed out of low loss, high silicon steel, or alternatively may be formed from vertical steel laminations as is known in the art. In addition to increasing the axial pre-load of the motor, the steel bobbin 602 increases the efficiency of the motor by reducing the effective air gap between the spindle motor magnet 344 and the coil windings 324.

Referring to FIG. 6b, a top view of the flat spindle motor 600 is shown including spindle or rotor magnet 344. As was described previously, the spindle magnet 344 is comprised of a plurality of alternatively polarized axially aligned poles 604 (wedge portions) spaced about 360 degrees coupled with an annular disc axial pole 606 located about the periphery of the axially aligned poles 604. Further, a non-magnetic region 605 is provided between poles 604 and disc magnetic region 606. The spindle magnet 344 sits above the plurality of stator winding assemblies 320 and responds to the changing current flows in the coil windings 324 of the stator winding assemblies 320. As can be seen from the figure, north and south axial aligned poles 604 overlap over the region of the steel bobbin 602 of the stator winding assemblies 320. As such, the steel bobbin 602 can act as a magnetic return path for magnetic flux, thereby increasing the flux density in the gap between the steel bobbin 602 and the spindle magnet 344. Those ordinarily skilled in the art will recognize that this configuration increases bearing efficiency and thereby improves motor performance.

Figure 7:
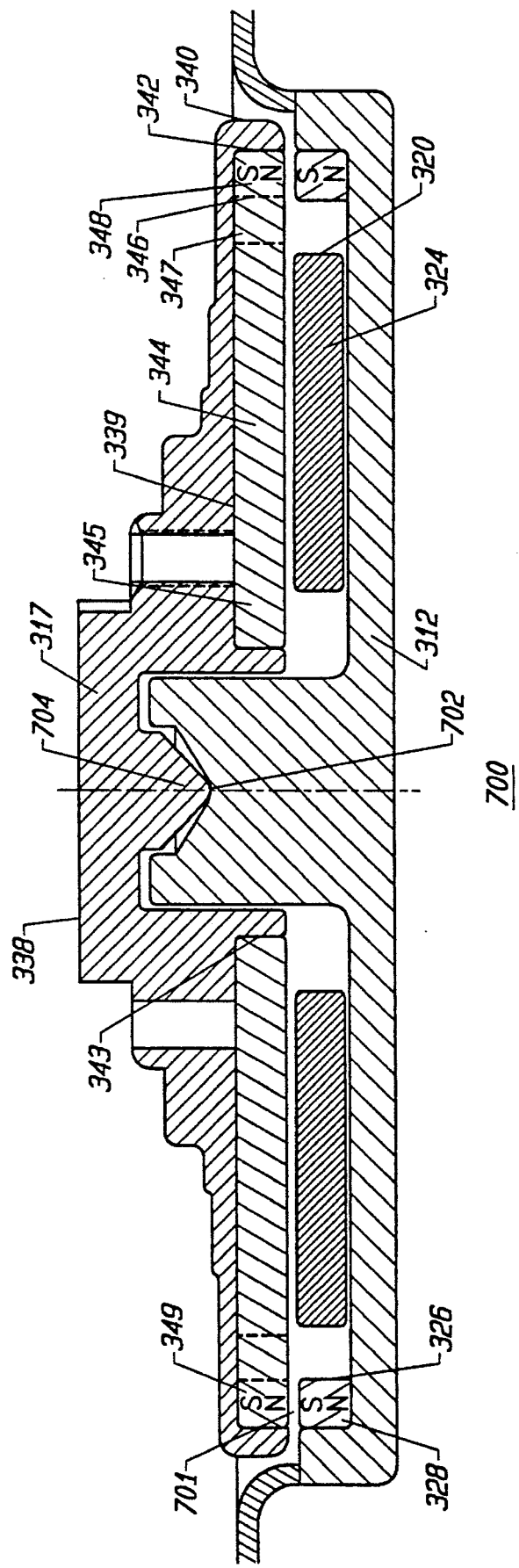
FIG. 7 is a cut away view of a disc drive incorporating an alternative embodiment of the present invention for use in a flat spindle motor having a magnetic bearing in attraction mode at the bottom of the motor along with a top pivot.

Referring next to FIG. 7, a second embodiment of the present invention will be described using like numbers to describe like parts. In this embodiment, a spindle motor 700 similar to the first embodiment is provided but includes a magnetic bearing 701 in attraction mode without offset and a top pivot. Spindle motor assembly 700 includes a stator 312 having a conventional axial pivot 702 around which a shortened hub shaft 704 of the rotor 317 rotates. Those ordinarily skilled in the art will recognize that a plurality of bearing types may be utilized at the axial pivot 702 including hydrodynamic, conventional, ceramic or ruby ball bearing systems, and as such the disclosure of a conventional bearing should in no way be construed as limiting. Additionally, the present invention is equally suited for fixed as well as a rotating shaft system as disclosed in the first embodiment.

Disposed on the fixed stator 312 is a plurality of stator windings 320 each comprising a bobbin 322 (not shown) surrounded by coil windings 324. In the preferred embodiment the stator windings 320 include a lightweight air-gap bobbin for supporting the coil windings 324, but as it will be described further below, other bobbin or stack configurations are equally well suited to this invention. A first annular disc 326 is disposed on the base of the stator 312 forming the lower portion of the magnetic beating 701. The first annular disc 326 comprises a single magnetic pole 328 which is journaled about the stator windings 320 and attached by means of an adhesive to the stator 312. In the preferred embodiment the disc is 1.0 mm in diameter, and 1.0 mm in height. The single magnetic pole 328 is oriented parallel to the axis of rotation of the hub shaft 316, with the south pole facing the rotor 317.

The rotor 317 is substantially drum shaped with a centrally disposed hub shaft 704 extending from the interior of the drum for engaging with the axial pivot 702. The rotor 317 further comprises a top 338, interior face 339, exterior side 340, interior wall 342 and interior shoulder 343. Disposed on the interior face 339 between the interior wall 342 and the interior shoulder 343 is a disc shaped spindle permanent magnet 344 in opposition to the stator windings 320. The spindle permanent magnet 344 comprises a first 345 and second end 346. The first end 345 further comprises a plurality of axially aligned poles which oppose the stator windings 320 and allow for the movement of the rotor about the stator as the coil windings 324 are alternatively energized. The second end 346 of the spindle permanent magnet 344 comprises a non-magnetized region 347 adjoining an axially magnetized region 348 which forms the top portion of the magnetic bearing 701.

The axially magnetized region 348 comprises a complementary single magnetic pole 349 (1.0 mm in diameter, and 1.0 mm in height) disposed on the interior wall 342 of the rotor 317 so as to align directly above the first magnet pole 328 which is attached to the stator 312. The complementary single magnetic pole 349 is formed by axially magnetizing the outer portion of the spindle permanent magnet 344 so as to create an axially aligned magnetic ring which forms the outer periphery of the spindle permanent magnet disc 344.

The complementary single magnetic pole 349 comprises a like oriented axially aligned pole which is aligned in attraction mode over and the opposing pole of the first annular disc 326. As in the first embodiment, the top and bottom portions of the magnetic bearing 701 (annular disc 326 and complementary axially magnetized region 348) are separated by a gap of 0.25 mm in height.

As the coils of the stator assembly 320 are alternately energized, the interaction of the magnetic fields with the current flow will result in movement of the rotor 317 about the pivot 702. The combination of the annular disc 326 and axially magnetized region 348 act in concert as a magnetic bearing, and as configured, provide balance, radial stiffness and axial pre-load to the completed assembly. The effect of the complementary magnet pairs in attraction about the entire circumference of the rotor provides a balanced force evenly distributed over the entire rotor, thereby providing a measure of radial balance as well as axial pre-load due to the attraction between the opposite polarity poles. An additional axial pre-load exists due to the attraction of the magnetic portions of the stator 312 to the spindle magnet 344. The complementary disc 326 and 346 configuration is resistant to radial shocks because of the uniform attraction forces that exist about the periphery of the rotor 317 due to the complementary poles 328 and 349. As such, the rotor 317 tends to stay centered about the axial pivot, maintaining a degree of radial stiffness.

One ordinarily skilled in the art would recognize that as compared to conventional ball bearing systems, the radial stiffness developed in the single pole configuration of the preferred embodiment is at least two orders of magnitude less than that provided by conventional ball bearing systems. However, again as described above a combination of magnetic and conventional bearings may be utilized to increase the performance of the bearing system.

Figure 8:
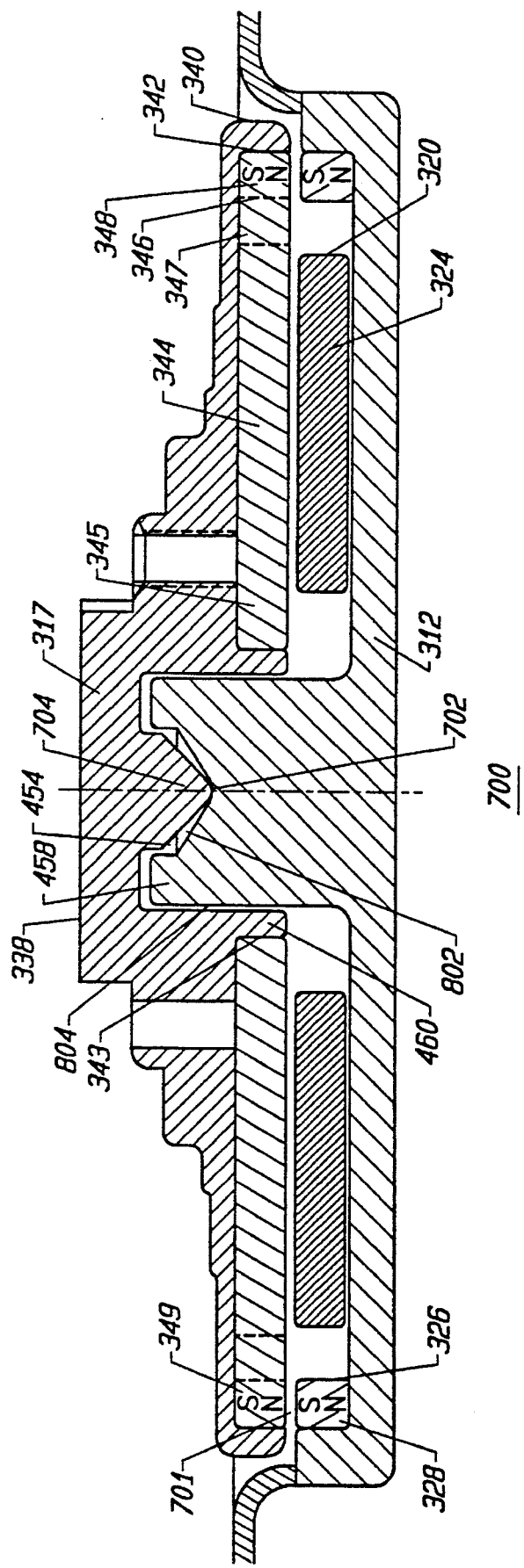
FIG. 8 is a cut away view of a disc drive flat spindle motor incorporating an alternative embodiment of the present invention including hydrodynamic bearings for greater axial and radial stiffness.

Referring now to FIG. 8, the second embodiment of the present invention is shown including an axial hydrodynamic bearing 802 for use at the pivot 702 and a radial hydrodynamic bearing 804 for increased radial stiffness. Those ordinarily skilled in the art, will recognize that while the disc 60 (not shown) is in motion, fluid (or air) utilized in the hydrodynamic bearing will fill the space between the bottom of hub shaft 704 and the bottom of the stator well 454 which constitutes a fluid (air) reservoir. As the pressure develops in the bearing, axial stiffness will increase, thereby augmenting the axial stiffness provided by the stand alone magnetic bearing. Similarly, a second hydrodynamic bearing 804 for use between the stator extensions 458 and the complementary rotor extensions 460 will provide increased radial stiffness. Again, as pressure develops in the closed reservoir, the fluid will expand and provide a rigid "cushion" between the surfaces of the rotor 317 and stator 312 yielding a significant increase over the radial stiffness provided by a magnetic bearing/conventional pivot configuration. While the hydrodynamic bearing only adds axial or radial stiffness upon operation (spin up), the combination of the hydrodynamic bearing and the magnetic bearing offers other benefits including dampening for non-operational shock attenuation as provided by the fluid reservoir system. As such the combination of the hydrodynamic bearing and the magnetic bearing offers a novel solution particularly well suited to use in a disc drive bearing system.

The magnetic bearing/hydrodynamic bearing pair also minimizes the motor start torque requirements of the spindle motor assembly 700. It is well known in the art, that after a hydrodynamic bearing comes to rest, contact often occurs between the hub shaft 704 and the side walls of the stator well 454. This is due to the lack of pressure in the hydrodynamic bearing which allows the fluid (or air) in the bearing to recede controlled by the laws of gravity. As such, upon start up, the hydrodynamic bearing requires a large motor torque to break free the metal to metal contact developed after the hub shaft has come to rest against the stator well side walls. The novel combination of the hydrodynamic bearing used as an axial pivot in conjunction with the magnetic bearing eliminates this motor start torque problem. Due to the attraction mode orientation of the complementarily aligned poles, upon coming to rest, the bearing system of the present invention would maintain the hub shaft 704 centrally disposed in the stator well 454, thereby eliminating any friction contact at start up. This alignment capability is unique to the magnetic bearing of the present invention.

Figure 9:
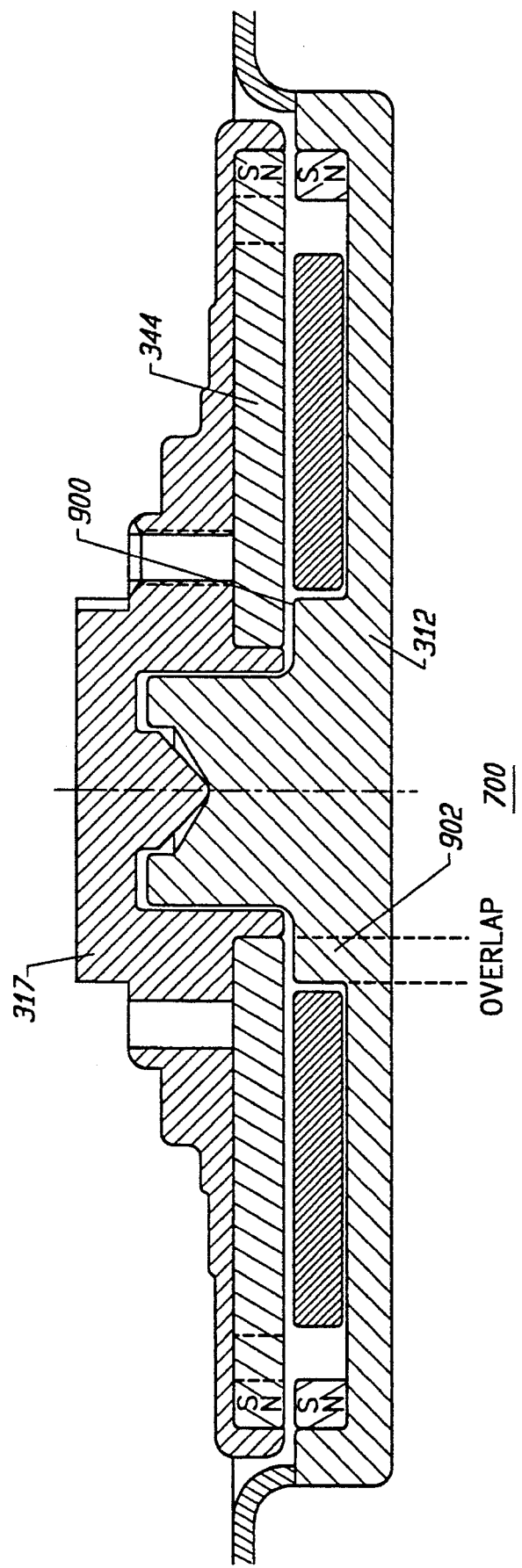
FIG. 9 is a cut away view of a disc drive flat spindle motor incorporating an alternative embodiment of the present invention including an extended base portion for greater axial pre-load.

Those ordinarily skilled in the art will recognize that the small axial pre-load that is provided by this configuration may be insufficient for all applications. Specifically, if higher axial loading is required, or if larger shock mitigation is desirable then this configuration can be augmented by the use of an extended steel base portion. Referring to FIG. 9, the second embodiment of the present invention is shown with an extended base portion 900. The extended base portion 900 provides strong attractive forces between the spindle motor magnet 344 and the base portion of the stator 312 in the overlap region 902. As such the rotor 317 is pre-loaded to engage with the stator 312 by means of the overlap portion 902 which acts as a magnetic return path for attractive forces developed between the spindle magnet 344 and the steel stator 312.

Referring next to FIG. 10*a*, a second means of increasing the axial pre-load is shown for a flat spindle motor 700. In this configuration, a steel bobbin 1002 is utilized extending the base portion of the stator 312 toward the spindle magnet 344 in the region of the stator winding assembly 320. In the preferred embodiment the steel bobbin 1002 may be constructed out of low loss steel, or alternatively may be formed from vertical steel laminations as is known in the art. In addition to increasing the axial pre-load of the motor, the steel bobbin 1002 increases the efficiency of the magnetic bearing by providing a magnetic flux return for the axial aligned poles of the spindle motor magnet 344.

Referring to FIG. 10*b*, a top view of the flat spindle motor 700 is shown including spindle magnet 344. As was described previously, the spindle magnet 344 is comprised of a plurality of alternatively polarized axially aligned poles 604 (wedge portions) spaced about 360 degrees coupled with an annular disc axial pole 606 located about the periphery of the axially aligned poles 604. A non-magnetic disc-shaped region 605 is also provided. The spindle magnet 344 sits above the plurality of stator winding assemblies 324 and respond to the changing current flows in the coil windings 324 of the stator winding assemblies 324. As can be seen from the figure, north and south axial aligned poles 604 overlap over the region of the steel bobbin 1002 of the stator winding assemblies 320. As such, the steel bobbin 1002 can act as a magnetic return path for magnetic flux, thereby increasing the flux density in the gap between the steel bobbin 1002 and the spindle magnet 344. Those ordinarily skilled in the art will recognize that this configuration increases bearing efficiency and thereby improves motor performance.

Shock attenuation or dampening capability is another parameter which may be optimized in the present invention. A disc drive system ordinarily makes use of a hard physical contact configuration as is found in a conventional bearing system coupled with some external shock mitigation means to prevent the rocking movement of the rotor about the stator. However, if a magnetic bearing is utilized, the physical interface between the rotor and the stator is lost thereby minimizing the effectiveness of any external shock mitigation system. Unfortunately, magnetic bearings in general demonstrate poor dampening characteristics because of their high natural frequency, and as such their use in disc drive environments which are characterized by high shocks would be limited. Accordingly, in order to overcome these limitations the present invention includes improved dampening means for use in a high shock environment.

Figure 11:
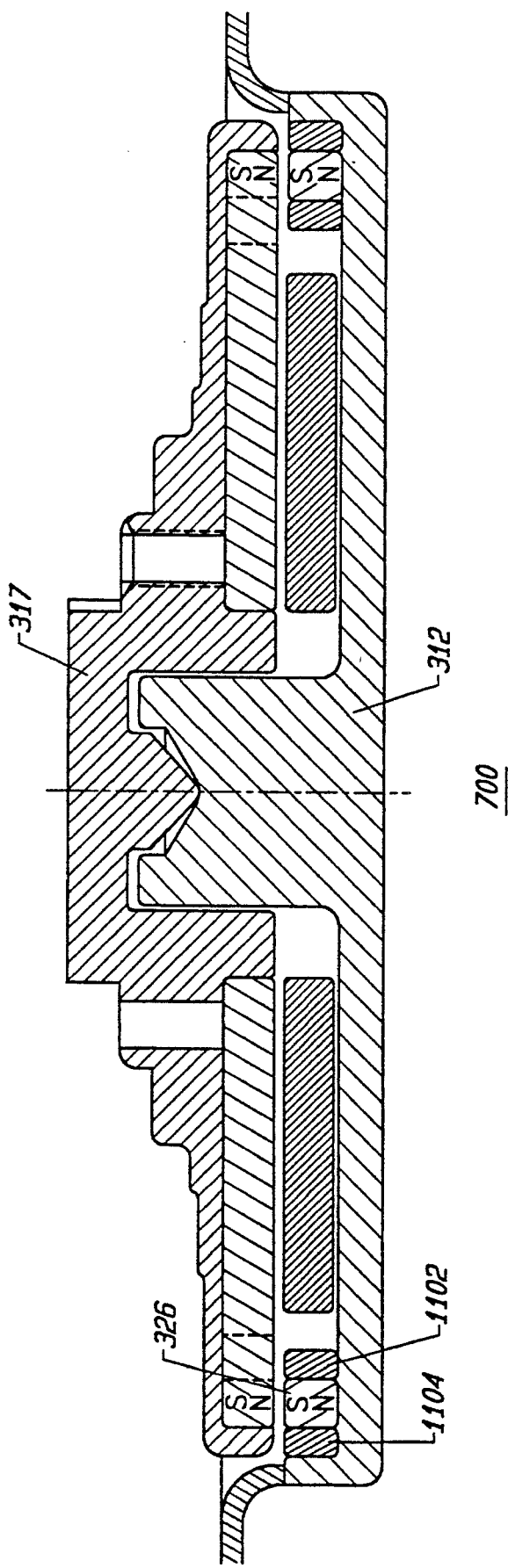
FIG. 11 is a cut away view of a disc drive flat spindle motor incorporating an alternative embodiment of the present invention including interior and exterior copper rings for generating eddy currents allowing for better magnetic bearing dampening characteristics.

Referring to FIG. 11, the second embodiment of the present invention is shown including dampening means 1100. In this configuration, two copper annular discs 1102 and 1104 are provided to be attached to the base of the stator 312 on either side of the first annular disc 326. The copper discs 1102 and 1104 act to dampening any wobble of the rotor 317 about the stator 312. This phenomenon occurs due to the eddy currents generated in the copper discs upon a change of flux or field strength as seen by the discs as the rotor moves farther away and closer to the respective copper discs (hence the "wobble"). According to Lenz' first law, the level of induced voltages induced in the copper will be proportional to the change in magnetic flux. The induced voltages in turn create induced currents which flow in a direction to oppose the changing magnetic flux. Induced forces will thereby inhibit the change in flux attempting to normalize the system, thereby effectively dampening the "wobble". In the absence of the "wobble," no magnetic flux change will be present and no inadvertent power losses will be realized. Accordingly, a magnetic bearing configured with copper discs 1102 and 1104 will provide a higher degree of dampening than any stand alone magnetic bearing configuration. In the preferred embodiment a copper annular disc of 0.5 mm in width and 0.1 mm in height is utilized, or may be substituted with a laminated disc as is required. Specifically, this configuration which provides side by side copper annular discs in close proximity to the opposing poles of the magnetic bearing is exceptionally well suited to dampening either axial or radial motion.

Figure 12:
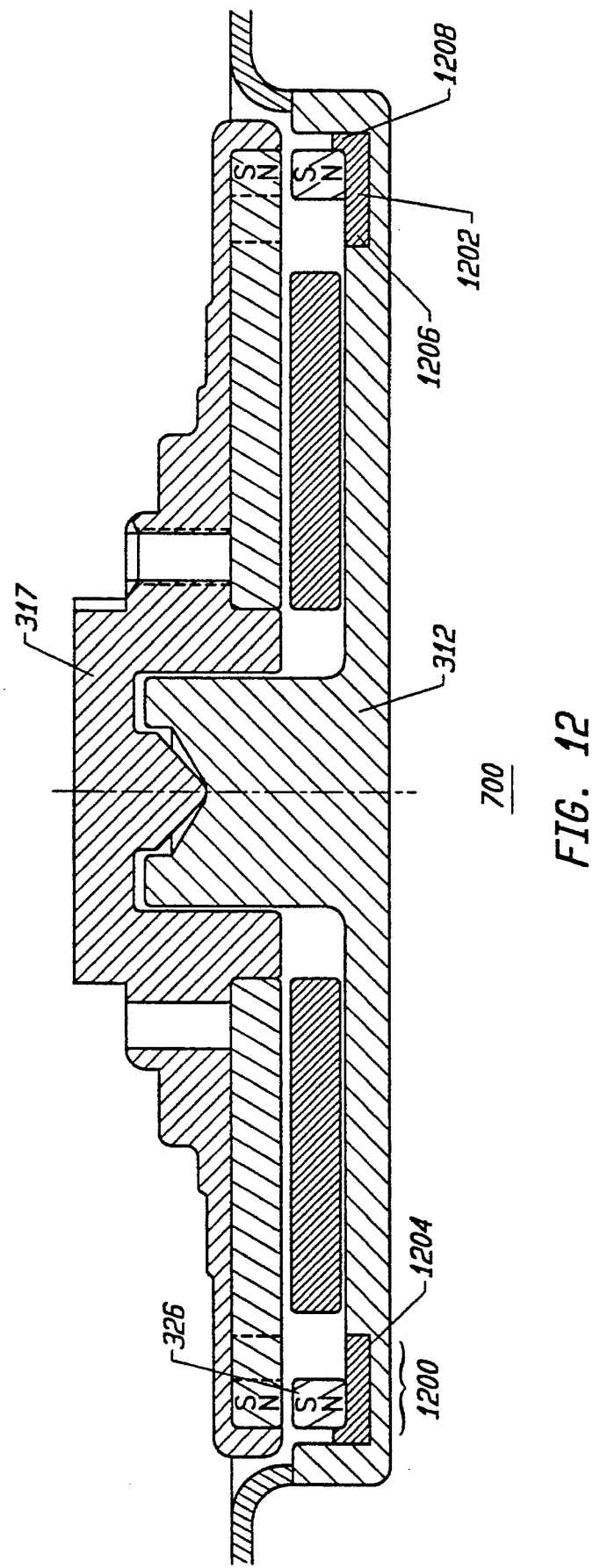
FIG. 12 is a cut away view of a disc drive flat spindle motor incorporating an alternative embodiment of the present invention including a copper disc L-shaped flange for generating eddy currents allowing for better magnetic bearing dampening characteristics.

Referring to FIG. 12, the second embodiment of the present invention is shown including a second dampening means 1200. In this configuration, a copper L-shaped annular flange 1202 is provided mounted in a recess 1204 of the base of the stator 312 beneath the first annular disc 326. Those ordinarily skilled in the art will recognize that the particular shape chosen for the copper flange will depend on the degree and direction dampening is required, and as such a flat or U-shape may be substituted as required. The copper L-shaped annular flange 1202 acts to dampening any wobble of the rotor 317 about the stator 312. By recessing the L-shaped flange in the base of the stator 312, the overall height of the flat spindle motor can be maintained at a minimum. The L-shaped configuration allows for improved axial dampening due to the large surface area of the copper disc and its positioning relative to the magnetic field of the magnetic bearing. Lying beneath and extending away from the magnetic bearing, the copper disc is less sensitive to radial changes in the magnetic field, yet remains sensitive to axial changes with respect to the tail and exposed base portion of the L-shaped annular flange. Again eddy currents are induced in the copper flange upon a change of flux or field strength as seen by the L-shaped flange as the rotor moves farther away and closer to the respective head 1206 and tail 1208 of the L-shaped flange. According to Lenz' first law, currents will be induced in the copper (eddy currents) which in turn will result in voltage and power losses in the copper and yield dampening. In the preferred embodiment the L-shaped annular flange 1202 is made of copper comprising an annular portion of dimension of 2 mm in width and 0.2 mm in height with a tail portion extending 0.1 mm in width and 0.1 mm in height extending from the annular portion of the L-shaped flange. While not as effective at dampening radial displacements, this configuration is more cost effective requiting only a single copper disc.

Figure 13:
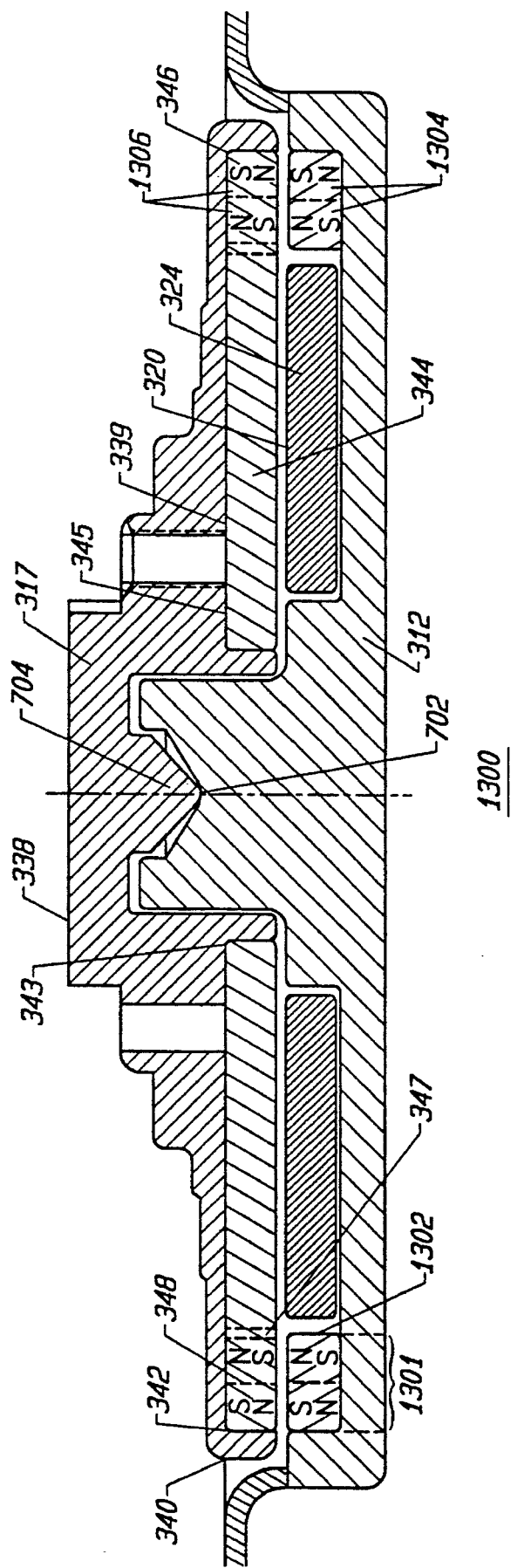
FIG. 13 is a cut away view of a disc drive incorporating a third embodiment of the present invention for use in a flat spindle motor having a magnetic bearing in repulsion mode radially opposing the spindle motor magnet of the flat spindle motor along with a bottom pivot.

Referring now to FIG. 13, a third embodiment of the present invention will be described using like numbers for like parts. In this embodiment, a flat spindle motor 1300 includes a first magnetic bearing in attraction mode with multiple poles for use in a motor having a conventional pivot 702 located at the top of the motor. In this embodiment, a spindle motor 1300 similar to the second embodiment is provided but includes a multipole magnetic bearing 1301 in attraction mode. Spindle motor assembly 1300 includes a stator 312 having a conventional axial pivot 702 around which a shortened hub shaft 704 of the rotor 317 rotates. Those ordinarily skilled in the art will recognize that a plurality of bearing types may be utilized at the axial pivot 702 including hydrodynamic, conventional, ceramic or ruby ball bearing systems, and as such the disclosure of a conventional bearing should in no way be construed as limiting. Additionally, the present invention is equally suited for fixed as well as a rotating shaft system as disclosed in the first embodiment.

Disposed on the fixed stator 312 is a plurality of stator windings 320 each comprising a bobbin 322 (not shown) surrounded by coil windings 324. In the preferred embodiment the stator windings 320 include a lightweight air-gap bobbin for supporting the coil windings 324, but as it will be described further below, other bobbin or stack configurations are equally well suited to this invention. A first annular disc 1302 is disposed on the base of the stator 312 forming the lower portion of the magnetic bearing 1301. The first annular disc 1302 comprises a pair of oppositely polarized magnetic poles 1304 which are journaled about the stator windings 320 and attached by means of an adhesive to the stator 312. In the preferred embodiment the disc is 2.0 mm in diameter, and 1.0 mm in height. The outermost magnetic pole 1304 is oriented parallel to the axis of rotation of the hub shaft 316, with the south pole facing the rotor 317.

The rotor 317 is substantially drum shaped with a centrally disposed hub shaft 704 extending from the interior of the drum for engaging with the axial pivot 702. The rotor 317 further comprises a top 338, interior face 339, exterior side 340, interior wall 342 and interior shoulder 343. Disposed on the interior face 339 between the interior wall 342 and the interior shoulder 343 is a disc shaped spindle permanent magnet 344 in opposition to the stator windings 320. The spindle permanent magnet 344 comprises a first 345 and second end 346. The first end 345 further comprises a plurality of axially aligned poles which oppose the stator windings 320 and allow for the movement of the rotor about the stator as the coil windings 324 are alternatively energized. The second end 346 of the spindle permanent magnet 344 comprises a non-magnetized region 347 adjoining an axially magnetized region 348 which forms the top portion of the magnetic bearing 1301.

The axially magnetized region 348 comprises a complementary pair of oppositely polarized axial magnetic poles 1306 (1.0 mm in diameter, and 1.0 mm in height each pole) disposed on the interior wall 342 of the rotor 317 so as to align directly above the first magnet pole pair 1304 which is attached to the stator 312. The complementary magnetic pole pair 1306 is formed by axially magnetizing the outer portion of the spindle permanent magnet 344 so as to create an axially aligned magnetic ring with two opposite polarity poles which forms the outer periphery of the spindle permanent magnet disc 344. The complementary magnetic pole pair 1306 comprises like oriented axially aligned poles which are aligned in attraction mode over and the opposing pole pair 1304 of the first annular disc 1302. As in the first embodiment, the top and bottom portions of the magnetic bearing 1301 (annular disc 1302 and complementary axially magnetized region 348) are separated by a gap of 0.25 mm in height.

As the coils of the stator assembly 320 are alternately energized, the interaction of the magnetic fields with the current flow will result in movement of the rotor 317 about the pivot 702. The combination of the annular disc 1302 and axially magnetized region 348 act in concert as a magnetic bearing, and as configured, provide balance, radial stiffness and axial pre-load to the completed assembly. The effect of the complementary magnet pairs in attraction about the entire circumference of the rotor provides increased radial stiffness over a single pole configuration. Those ordinarily skilled in the art will recognize that the multipole configuration may be increased to include three or more pole pairs depending on the particular application requirements, and as such the disclosure of a pair of poles should not be construed as limiting. Additionally, one ordinarily skilled in the art would recognize that this third embodiment is equally well suited to the include an extended base portion, dampening copper rings, steel bobbin, or hydrodynamic bearings in order to improve radial and axial stiffness or dampening characteristics as have been described above in conjunction with the first and second embodiments.

Figure 14:
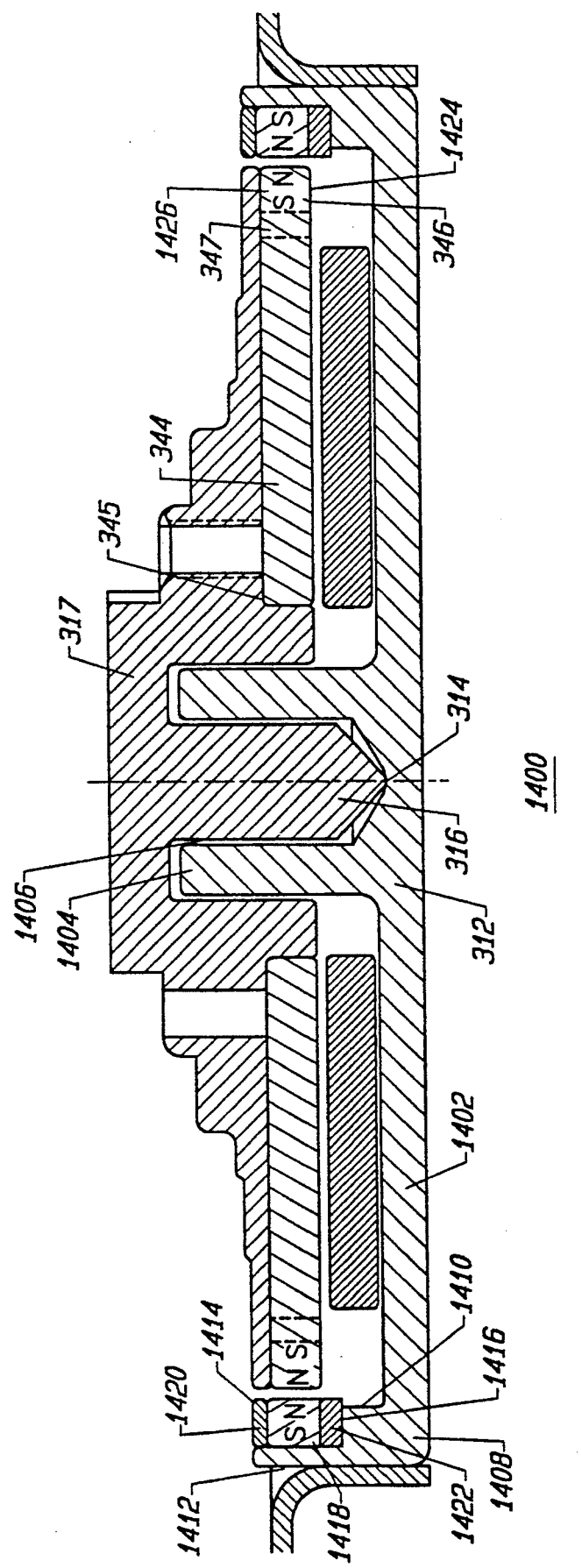
FIG. 14 is a cut away view of a disc drive flat spindle motor incorporating a fourth embodiment of the present invention including a reduced height radial magnetic bearing configuration.

Referring now to FIG. 14, a fourth embodiment of the present invention will be described using like numbers to describe like parts. In this embodiment, a reduced height spindle motor 1400 similar to the first embodiment is provided including a magnetic beating on top of the motor with a bottom pivot 314. Spindle motor assembly 1400 includes a stator 312 having a conventional axial pivot 314 around which a hub shaft 316 of the rotor 317 rotates. Those ordinarily skilled in the art will recognize that a plurality of bearing types may be utilized at the axial pivot 314 including hydrodynamic, conventional, ceramic or ruby ball bearing systems, and as such the disclosure of a conventional bearing should in no way be construed as limiting. Additionally, the present invention is equally suited for fixed as well as a rotating shaft system as disclosed in the first embodiment.

The stator 312 is substantially drum shaped with a base portion 1402, a centrally disposed raised cylindrical portion 1404 which forms the stator well 1406 for receiving the hub shaft 316 of the rotor 317, and raised annular end flange 1408 having interior 1410 and exterior 1412 walls. Disposed on the base 1402 of the fixed stator 312 is a plurality of stator windings 320 each comprising a bobbin 322 (not shown) surrounded by coil windings 324. In the preferred embodiment the stator windings 320 include a lightweight air-gap bobbin for supporting the coil windings 324, but as it will be described further below, other bobbin or stack configurations are equally well suited to this invention. A first annular disc 1414 is disposed in a recess 1416 in the interior wall of the end flange 1408 of the stator 312 forming the outer portion of the magnetic bearing. The first annular disc 1414 comprises a single magnetic pole 1418 disposed between a thin metal portion 1420 and a copper disc 1422 which together are attached by means of an adhesive to the stator 312. In the preferred embodiment the pole is 1.0 mm in diameter, and 1.0 mm in height, the disc is 1.0 mm in diameter and 0.5 mm in height, and finally the thin metal portion is 1.0 mm in diameter and 0.2 mm in height. The single magnetic pole 1418 is oriented perpendicular to the axis of rotation of the hub shaft 316, with the north pole facing the rotor 317.

The rotor 317 includes a centrally disposed hub shaft 316 extending from the interior of the rotor for engaging with the axial pivot 314. The rotor 317 further comprises a top 338, interior face 339 and interior shoulder 343. Disposed on the interior face 339 extending from the interior shoulder 343 to the outer edge of the rotor 317 is a disc shaped spindle permanent magnet 344 in opposition to the stator windings 320. The spindle permanent magnet 344 comprises a first 345 and second end 346. The first end 345 further comprises a plurality of axially aligned poles which oppose the stator windings 320 and allow for the movement of the rotor about the stator as the coil windings 324 are alternatively energized. The second end 346 of the spindle permanent magnet 344 comprises a non-magnetized region 347 adjoining an radially magnetized region 1424 which forms the inside portion of the magnetic bearing.

The radially magnetized region 1424 comprises a complementary single magnetic pole 1426 (1.0 mm in diameter, and 1.0 mm in height) disposed on the interior wall 342 of the rotor 317 so as to align oppositely and slightly offset beneath in relationship to the first magnet pole 1418 which is attached to the stator 312. The complementary Single magnetic pole 1426 is formed by radially magnetizing the outer portion of the spindle permanent magnet 344 so as to create a radially aligned magnetic ring which forms the outer periphery of the spindle permanent magnet disc 344. The complementary single magnetic pole 1426 comprises an oppositely oriented radially aligned pole which is aligned in repulsion mode beside and offset beneath of the opposing pole of the first annular disc 1414. The offset provided for in the preferred embodiment may be adjusted so as to vary the axial pre-load that is required by the system. Accordingly, pre-load can be maximized by providing for a small positive offset (rotor pole slightly beneath the stator pole) while the pre-load can be minimized (effectively eliminated as the poles act to repel the rotor upward) if a negative offset is utilized. As in the first embodiment, the inside and outside portions of the magnetic bearing (annular disc 1414 and complementary radially magnetized region 1426) are separated by a gap of 0.25 min.

As the coils of the stator assembly 320 are alternately energized, the interaction of the magnetic fields with the current flow will result in movement of the rotor 317 about the pivot 314. The combination of the annular disc 1414 and radially magnetized region 1426 act in concert as a magnetic bearing, and as configured, provide balance, radial stiffness and axial pre-load to the completed assembly. In this configuration the steel portion 1420 of the annular disc 1414 acts as a magnetic return path for the magnetic bearing for increased efficiency and for channeling the magnetic flux in this region to maintain the integrity of the magnetic discs which lie in close proximity to this raised magnetic bearing configuration. As described previously, the copper disc region 1422 acts to improve bearing dampening by providing for induced eddy currents upon changes in the magnetic field of the magnetic bearing in relationship to the copper disc. In this configuration, radial stiffness is comparable to the other single pole magnetic bearing disclosed herein, however, more importantly, a radial bearing configuration allows for a reduced height flat spindle motor. Specifically, because of the orientation of the previously disclosed magnetic bearing configurations, a smaller height disc drive would not be able to be realized due to the stacked configuration. Accordingly, even upon the development of smaller or alternate means for a motor winding 320, the disc drive height could not be reduced. The present invention allows for a further reduced height flat spindle motor by incorporating radial bearings no larger in height than the standard spindle magnet 344.

Figure 15:
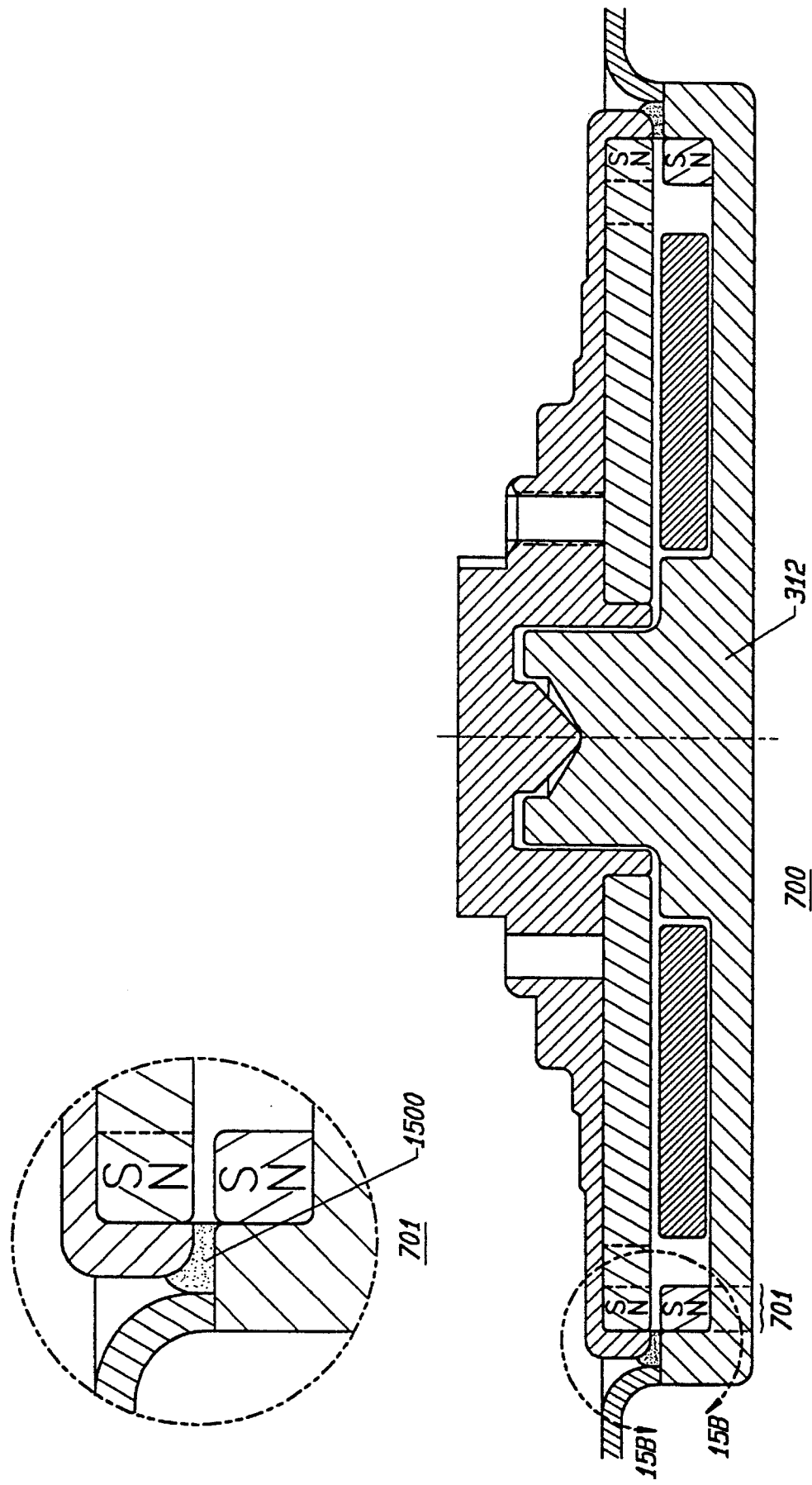
FIG. 15 is a cut away view of an alternative embodiment of the present invention incorporating contamination control means.

Referring now to FIG. 15, a means for maintaining contamination control for all of the magnetic bearing embodiments disclosed herein is shown. A flat spindle motor 700 similar to the second embodiment described herein is shown including rotor 317 and stator 312. In the prior art, the rotor 317 and stator 312 were ordinarily required to be separated at their periphery so as to allow for the free rotation of the rotor about the stator. This opening potentially allowed contaminants to move out of the spindle motor system, often yielding deleterious effects to motor performance or contaminating the hard disc drive where the motor is used. Spindle motor 700 includes a magnetic bearing 701 having complementary magnetic poles 328 and 349 in attraction mode and a ferro-fluid seal 1500. In the preferred embodiment the ferro-fluid seal 1500 is comprised of a liquid with iron-particles part number 100 or 200 manufactured by the Ferrotech Corporation; many equivalent fluids are known to those of skill in the art and can readily be substituted. The magnetic bearing 701 acts to hold the ferro-fluid in the joint formed between the rotor and stator, thereby sealing in contaminants. In this configuration, dampening of rotor wobble is also achieved due to the fluid properties of the seal.

Figure 16:
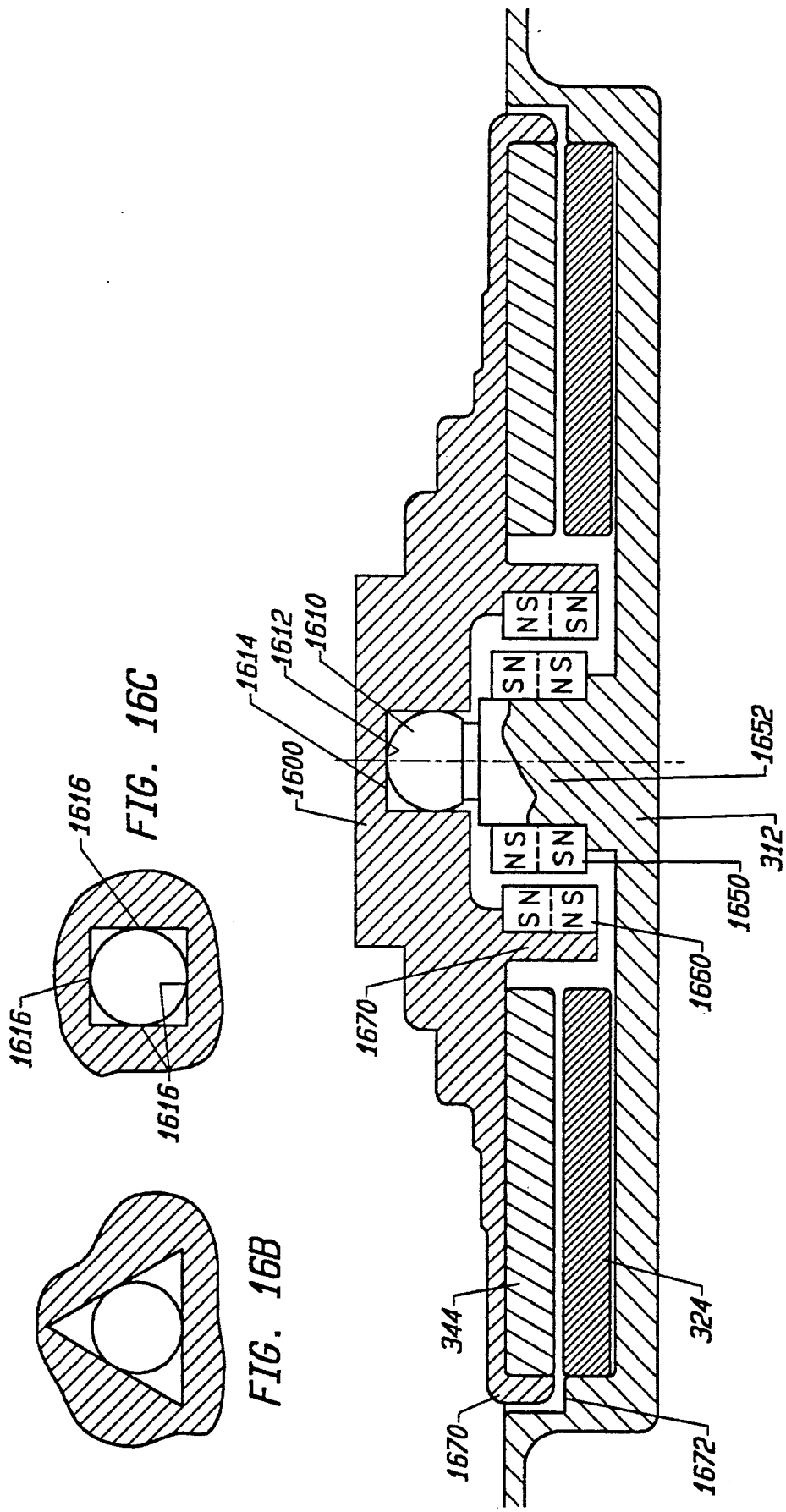
FIGS. 16A, B, and C are cutaway view of alternative embodiments of the invention utilizing a ball bearing and cup pivot support for the rotating hub, and offset magnetic poles for improved radial stiffness.
Figure 17:
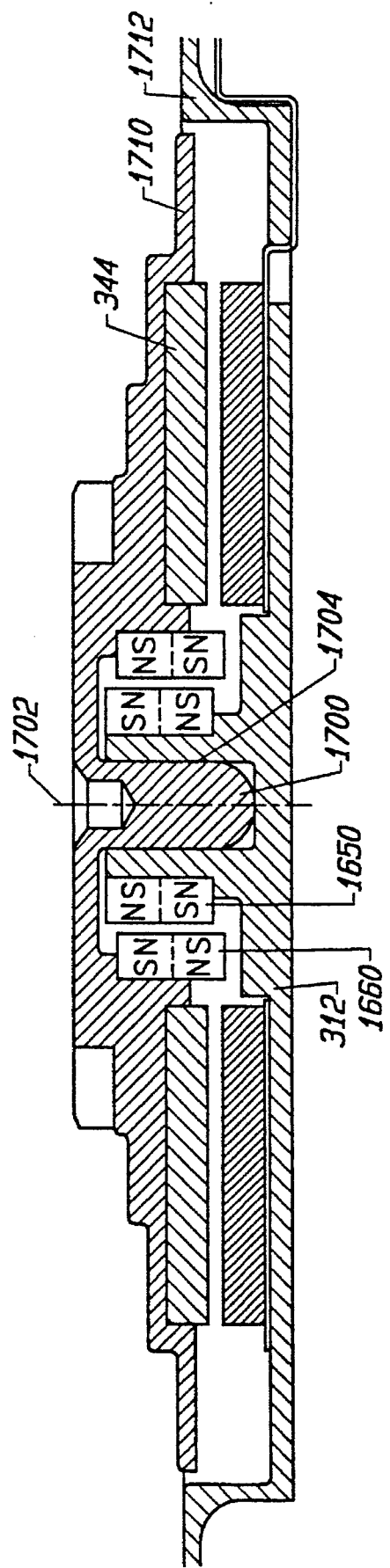
FIG. 17 is a cutaway view of an alternative embodiment to the invention basically disclosed in FIG. 16 utilizing a hydrodynamic bearing.

Referring next to FIG. 16, the invention here utilizes a combination of a unique pivot for the hub which provides substantially increased radial stiffness, selectively designed and placed offset magnets to provide an additional bearing structure and a unique rotor hub design to provide increased axial stiffness. Specifically, as shown at the top of FIG. 16, the rotor 1600 which supports a disk or disks for rotation is supported from a circular member which may be a ball bearing, ruby jewel or the like 1610. As shown by the top sectional views of FIGS. 16B and 16C, a five-point contact may be used comprising contact between the top 1612 of the ball bearing and the bottom inner surface 1614 of the top of the hub, as well as the four sides 1616 of the interior of the hub. Alternatively, a four-point contact as shown in FIG. 16B can be defined between the top of the ball bearing and the three sides of a triangular-shaped opening 1617 in the interior of the hub 16. In either case, a relatively stiff radial pivot is defined, which is especially useful in combination with the magnetic bearing shown below.

In this magnetic bearing approach, supported on the base 312 is a first pair of oppositely-polarized magnetic poles 1650 which are journaled about the support 1652 for the ball bearing 1610 of the radial pivot. Typically, the pair of polarized magnetic poles 1650 are attached to this shaft by adhesive which is not shown here. This pair of poles is typically in the shape of a relatively thin annular disk.

As can be clearly seen in FIG. 16A, an opposed pair of magnetic poles 1660 is mounted from the hub 1600 opposite the first pair of poles 1650 but intentionally partially offset relative to the first pair of poles. This second pair of magnetic poles is preferably mounted to a lower extension 1670 of the hub which extends vertically below the region where the rotor magnet 344 and stator windings 324 are found. This second pair of magnetic poles is also in the shape of an annular disk and attached by adhesive to this hub extension.

These pairs of poles 1650, 1660 are offset to provide an axial downforce. The preferred ratio is that the offset is one-quarter of the size of the magnet relative to the height of the magnet. Therefore, for a 1.0 mm magnet, a 0.25 mm offset would be utilized. The repulsion between adjacent north and south regions of pole pairs 1650, 1660 provides radial stiffness; the repulsion between the north and south regions of the adjacent pole pairs also provides for the necessary axial preload. This preload is created by the fact that as the hub moves up relative to the base 312, the opposing, repelling poles of magnets come even closer together, forcing the opposing magnets back to their original position. A more detailed explanation can be found in the application entitled "Cartridge Disc Drive With Magnetic Bearings", by Dunfield et al., Attorney Docket No. A-59070 incorporated herein by reference. This system provides for a freely rotating spindle motor, with the axial stiffness being further reinforced by the downturned lip region 1670 at the distal end of the hub which cooperates with the magnetic force of the magnet 344 and the magnetic material in the base 312 and specifically the upwardly extending region 1672 to provide a magnetic interaction between hub and base, helping maintain the hub in position without tilting or rocking.

FIG. 16A should be compared with FIG. 7 which shows an alternative approach to the invention in which the pairs of poles 1650, 1660 are utilized to provide axial preload while allowing free rotation of the hub, but the hub is supported by a hydrodynamic bearing 1700, comprising a rotating shaft 1702 extending down from the hub, and supported inside a journal 1704 extending up from the base 312. This approach allows for relatively free rotation of the hub, while also providing additional radial stiffness. This approach allows use of extension 1710 of the hub which extends out beyond the magnet 344 to form a small gap with the upturned end 1712 of the base 312 considerably beyond stator magnet 344, considerably reducing the likelihood of stray magnetic fields from the motor interacting with the discs.

The magnetic bearing motor of FIG. 18 is a further alternative to the embodiments previously described which provides by virtue of the magnetic bearings utilized substantial radial stiffness to the overall design, a feature which is useful in all spindle motors for use with disc drives and other such systems, and is a especially useful in combination with a hydrodynamic bearing for supporting the main rotating hub of the motor. As can be seen by an inspection of FIG. 18, the base 312 supports a pair of disc-shaped axial magnetic poles 1802, 1804, separated by an air gap 1806. The magnetic poles 1802, 1804 in this embodiment are preferably polarized in the same direction, and preferably of dimensions approximately 1.0 mm in diameter and 1.0 mm in height. They are separated by an air gap of about the same dimension, i.e. 1.0 mm, and a further axial magnetic pole 1810 is supported from the rotating hub above the gap 1806. This pole is separated from the primary magnet of the motor by an non-magnetized region 1812 in order to keep any magnetic flux emanating from this magnetic bearing away from the motor magnet. Thus, the non-magnetized region 1812 is preferably of greater diameter than the diameter of magnetic pole 1804 with which it is aligned, and preferably extends all the way to the edge of the magnet 344 to the point where it is overlying the windings 345 of the spindle motor.

As can be seen from an inspection of the figure, the complementary poles 1802, 1804, 1810 are arranged to operate in a repulsion mode. It is apparent from inspection that the oppositely oriented complementary magnetic poles would prevent or restrain any tilt or wobble in the rotating hub 317 as it rotates under the influence of the coils 345 and magnet 344. Moreover, the offset, near-interleaved configuration of the motor magnetic bearings allows for the design of a very low-profile spindle motor. The motor is further characterized by its ease of assembly due to the one magnetic pole being placed directly against the upright end flange 1408 on the base 312, the complementary pole 1810 being incorporated directly beneath the spinning hub 317, and the final complementary magnetic pole 1804 being located between the windings 345 and the outer magnetic disc 1802 and aligned between the non-magnetic portion 1812.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. Specifically, reference has been made to magnetic beating systems (including hydrodynamic bearings) for use in axial pivots. Those ordinarily skilled in the art will recognize that the description is equally suited to radial pivot applications, orientation merely an engineering choice without import to the considerations disclosed herein.

Further, in many circumstances, the positions of the magnet and coil could be reversed. In other words, either the magnet or coil could be rotating. All dimensions and materials are exemplary, or in certain circumstances, specifically noted may be preferred. Obviously, however, other dimensions and materials may be substituted without departing from the spirit and scope of the invention.

What is claimed is:

1. In a reduced height disc drive having a flat spindle motor assembly comprised of a spindle permanent magnet held in opposition to an electromagnet assembly attached to a stator, an apparatus for journaling a rotor having a hub shaft about said stator of said flat spindle motor comprising:

said stator comprising a base portion and a stator well, said stator well comprising a raised centrally disposed cylindrical portion disposed on said base portion, said stator well for receiving said hub shaft;

a pivot, said pivot for pivotally displacing said rotor about said stator, said pivot for engaging said hub shaft at a base portion of said stator well;

a first annular disc, said disc comprising an axially aligned magnetic pole, said disc radially extending from said stator;

a spindle permanent magnet having a first and second end and non-magnetized region disposed there between, said first end comprising a plurality of magnetic poles disposed on said rotor in opposition to said spindle motor electromagnet assembly, said second end comprised of a like axially aligned magnetic pole disposed on said rotor, opposing and offset to the inside of said axially aligned magnetic pole on said first annular disc; and an annular base extension, said annular base extension integral to said base portion of said stator beginning at an exterior wall of said stator well and extending toward and at a height equal to said electromagnet assembly and directly beneath said first end of said spindle permanent magnet, whereby said rotor is preloaded due to the attractive forces developed between said annular base extension and said first end of said spindle permanent magnet.

2. In a reduced height disc drive having a flat spindle motor assembly comprised of a spindle permanent magnet held in opposition to an electromagnet assembly attached to a stator, an apparatus for journaling a rotor having a hub shaft about said stator of said flat spindle motor comprising:

said stator comprising a base portion and a stator well, said stator well comprising a raised centrally disposed cylindrical portion disposed on said base portion, said stator well for receiving said hub shaft;

a pivot, said pivot for pivotally displacing said rotor about said stator, said pivot for engaging said hub shaft at a base portion of said stator well;

a first annular disc, said disc comprising an axially aligned magnetic pole, said disc radially extending from said stator;

a spindle permanent magnet having a first and second end and non-magnetized region disposed there between, said first end comprising a plurality of magnetic poles disposed on said rotor in opposition to said spindle motor electromagnet assembly, said second end comprised of a like axially aligned magnetic pole disposed on said rotor, opposing and offset to the inside of said axially aligned magnetic pole on said first annular disc; and an electromagnet assembly comprising a coil wrapped about a steel bobbin, whereby said rotor is pre-loaded due to the attractive forces developed between said steel bobbin and said first end of said spindle permanent magnet.

3. In a reduced height disc drive having a flat spindle motor assembly comprised of a spindle permanent magnet held in opposition to an electromagnet assembly attached to a stator, an apparatus for journaling a rotor having a hub shaft about said stator of said flat spindle motor comprising:

said stator comprising a base portion and a raised centrally disposed cylindrical column disposed on said base portion, said column having a recessed region for receiving said hub shaft;

a pivot, said pivot for pivotally displacing said rotor about said stator, said pivot for engaging said hub shaft at said recess of said cylindrical column;

a first annular disc, said disc comprising a first axially aligned magnetic pole, said disc radially extending from said stator;

a spindle permanent magnet having a first and second end and non-magnetized region disposed there between, said first end comprising a plurality of magnetic poles disposed on said rotor in opposition to said spindle motor electromagnet assembly, said second end comprised of a first like axially aligned magnetic pole disposed on said rotor, opposing said axially aligned magnetic pole on said first annular disc; and bearing means disposed between said hub shaft and said stator well, said beating means for providing additional radial stiffness to said flat spindle motor assembly.

4. The apparatus of claim 3 wherein said bearing means is a radial hydrodynamic beating.

5. The apparatus of claim 3 wherein said bearing means includes a pair of radial hydrodynamic bearings, a first of said pair of hydrodynamic bearings disposed between an inner wall of said stator well and said hub shaft, a second of said pair of radial hydrodynamic bearing disposed between an outer wall of said stator well and a inner shoulder of said rotor, said pair of radial hydrodynamic bearings for increasing the radial stiffness of the said flat spindle motor.

6. The apparatus of claim 3 wherein said stator further comprises an annular base extension, said annular base extension integral to said base portion of said stator beginning at an exterior wall of said stator well and extending toward and at a height equal to said electromagnet assembly and directly beneath said first end of said spindle permanent magnet, whereby said rotor is pre-loaded due to the attractive forces developed between said annular base extension and said first end of said spindle permanent magnet.

7. The apparatus of claim 3 wherein said electromagnet assembly further comprises a coil wrapped about a steel bobbin, whereby said rotor is pre-loaded due to the attractive forces developed between said steel bobbin and said first end of said. spindle permanent magnet.

8. The apparatus of claim 3 wherein said first annular disc further comprises dampening means for dampening wobble of said rotor about said stator due to axial or radial shock.

9. The apparatus of claim 8 wherein said dampening means comprises a pair of copper annular rings, said axially aligned magnet pole disposed therebetween, whereby currents are induced in said copper rings in opposition to said axial or radial shocks thereby dampening their effect.

10. The apparatus of claim 8 wherein said dampening means comprises a L-shaped copper flange disposed in a recess in said stator beneath said first annular disc, said L-shaped copper flange having a head and extended tail portion, said tail portion extending upward along an outside edge of said first annular disc and said head portion disposed beneath said annular disc flush with said stator toward said electromagnet assembly.

11. The apparatus of claim 3 wherein:

said first annular disc further comprises at least one second axially aligned magnetic pole of opposite polarity to said first axially aligned pole, and said second end of said spindle permanent magnet further comprises complementary second axially aligned magnetic poles for providing increased radial stiffness to said flat spindle motor.

12. The apparatus of claim 1 wherein said first annular disc is disposed 0.25 mm beneath said axially magnetized region.

13. The apparatus of claim 1 wherein said pivot is an axial hydrodynamic bearing.

14. The apparatus of claim 1 wherein said pivot is a conventional ball bearing.

15. The apparatus of claim 1 wherein said pivot is a ruby ball bearing.

16. The apparatus of claim 1 wherein said pivot is a ceramic ball bearing.

17. The apparatus of claim 1 wherein said bearing means is a radial hydrodynamic bearing.

18. The apparatus of claim 1 wherein said bearing means includes a pair of radial hydrodynamic bearings, a first of said pair of hydrodynamic bearings disposed between an inner wall of said stator well and said hub shaft, a second of said pair of radial hydrodynamic bearing disposed between an outer wall of said stator well and an inner shoulder of said rotor, said pair of radial hydrodynamic bearings for increasing the radial stiffness of the said flat spindle motor.

* * * * *